United States Patent [19]
Flowerdew

[11] Patent Number: 5,966,641
[45] Date of Patent: Oct. 12, 1999

[54] AERIAL ARRAYS FOR INDUCTIVE COMMUNICATIONS SYSTEMS

[75] Inventor: Peter M. Flowerdew, Brentry, United Kingdom

[73] Assignee: Plantronics, Inc., Santa Cruz, Calif.

[21] Appl. No.: 08/742,337

[22] Filed: Nov. 1, 1996

[51] Int. Cl.$^6$ .................................................. H04B 5/02
[52] U.S. Cl. ........................... 455/41; 455/129; 455/269; 455/562; 343/867
[58] Field of Search ..................................... 343/867, 742, 343/788; 455/41, 274, 269, 129, 517, 562

[56] References Cited

FOREIGN PATENT DOCUMENTS

| | | | |
|---|---|---|---|
| 27 08 464 | 9/1977 | Germany ........................... | H04B 1/18 |
| 06253375 | 9/1994 | Japan ................................. | H04Q 9/00 |
| 1164281 | 9/1969 | United Kingdom ............. | H04B 5/00 |
| 2 197 160 | 5/1988 | United Kingdom ............. | H04B 5/02 |
| WO 96/37052 | 11/1996 | WIPO ................................ | H04B 5/02 |

OTHER PUBLICATIONS

International Search Report for International Application No.: PCT/US97/19675.

*Primary Examiner*—Nguyen Vo
*Attorney, Agent, or Firm*—Fenwick & West LLP

[57] ABSTRACT

A communication link includes a base unit and a remote unit that each include a transmit aerial and a receive aerial. These units communicate via magnetic inductive fields. The transmit aerial may be an array that shapes the field to transmit in front of the base unit to minimize interference between adjacent base units. Transmission from the base unit to the remote unit preferably uses magnetic inductive fields that are orthogonal to the magnetic inductive fields that transmit from the remote unit to the base unit. Accordingly, the aerials include aerials for receiving and transmitting in such orientations. A tri-axial array includes three aerials that are orthogonal to each other to allow the aerials to be driven by currents that are phase shifted and amplitude modulated so that the plane of the field is selectively tilted to maximize coupling between the base unit and remote unit. Such tilting allows the user of the remote unit to move relative to the base unit and maintain maximum coupling.

9 Claims, 15 Drawing Sheets

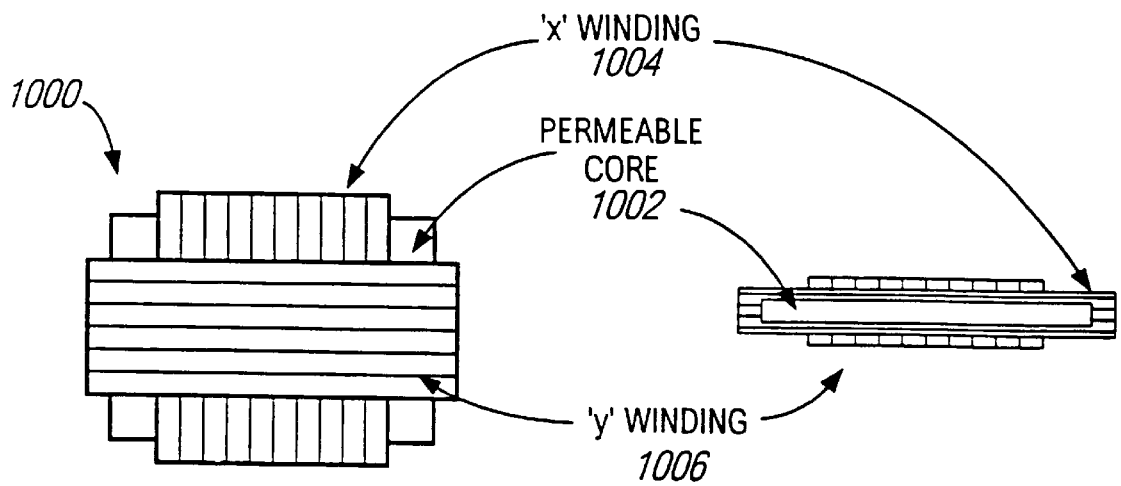
FIG. 10A
FIG. 10B
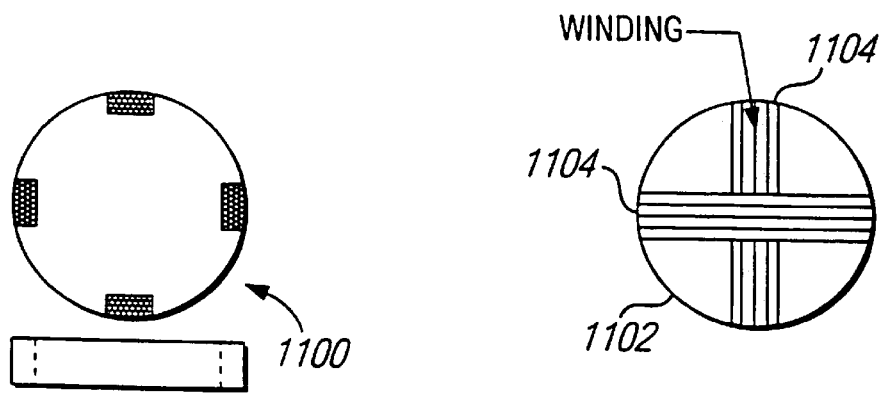
FIG. 11A
FIG. 11B

NOTE:
AUXILIARY FIELD
IS ANTIPHASE TO
MAIN FIELD

TRANSMIT ARRAY    RECEIVE AERIAL

TRANSMIT ARRAY    RECEIVE AERIAL

ALL CURRENT IN COIL B

EQUAL CURRENT IN
BOTH COILS

AERIAL ARRAYS FOR INDUCTIVE COMMUNICATIONS SYSTEMS

FIELD OF THE INVENTION

This invention relates to aerial arrays for wireless communications systems, and more particularly to aerial arrays for cordless telephone systems.

BACKGROUND OF THE INVENTION

Local wireless communication systems typically use ultrasound, radio frequency or infrared carriers to transmit data between transmitters and receivers. These systems have scattering of the carrier which interferes with nearby transmitters and receivers. Ultrasonic and infrared systems require a line-of-sight communication channel between transmitters and receivers. The radio frequency system also has a long range because of the 1/r decay of the transmitted signal.

Magnetic inductive systems have been used in commercial applications, such as audio loops in buildings, direct speech communication through security screens, and low-rate data links from underground to equipment on the surface. The security screens typically include coils built into desk mats on both sides of the screen.

Local wireless communication systems, such as telephone systems, include a wireless audio headset worn by a user. The user's workstation communicates voice data between a telephone line and the headset. Conventional systems transmit data from the workstation over a wide area adjacent to the workstation. This data may interfere with nearby workstations.

It is desirable to have a communication system, such as a telephone headset, that may be operated in a dense office environment with low interference between adjacent work stations. It is also desirable to have a communication system that allows the user to move within a work area around the work station without a loss of or a break in the communication link.

Inductive aerials inherently amplitude modulate signals transmitted through an inductive link between the inductive aerials. At lower frequencies, changes in frequency of the communication signal due to intended modulation of the communication signal when added to the amplitude modulation from the communication link generate large percentage changes in amplitude that compromise the dynamic range of the system. In particular, this compromise includes degraded demodulating or decoding performance of a receiver.

It is desired to reduce the effects of the frequency dependent nature of the sensitivity of inductive aerials on the performance of an inductive communication link. It is desired that such reduction in frequency dependence include both the receiving and transmitting aerials. The operating frequency range of a communication system typically is controlled by a governmental regulatory agency. It is also desired the operating frequency of such a system be extended to lower frequencies to thereby use a -larger portion of the limited spectrum window.

SUMMARY OF THE INVENTION

In the present invention, a communication link uses magnetic inductive fields to communicate between a base unit and a remote unit.

It is advantageous to use magnetic inductive fields because such fields do not require line-of-sight between the base unit and a remote unit. Such fields have a limited range, because they have a cube law decay, and do not scatter.

A communication link includes first and second aerials. The first aerial generates a first magnetic inductive field for communication to the second aerial and receives a second magnetic inductive field from the second aerial. The first aerial may be a loop having a length that is substantially greater than the width. The second aerial may include a first loop and a second loop that is perpendicular to the first loop. The second aerial may include a permeable core with the first and second loops disposed on the permeable core. The permeable core may be box shaped or ellipsoid shaped, and the first and second loops are disposed in respective planes perpendicular to each other.

The first magnetic inductive field has a first orientation and the second magnetic inductive field has a second orientation that may be orthogonal to the first orientation.

The first aerial may be an antenna array including a first antenna aerial having a loop shape and having a rectangular transverse cross section and including a second antenna having a loop shape and having a rectangular transverse cross section, the shorter surface of the second antenna being disposed perpendicular to the first antenna. The aerial may be, for example, a T-shape, L-shape, or cruciform transverse cross-section.

Likewise, the second aerial may include first, second, and third loops, which are perpendicular to each other and disposed on a permeable core. The permeable core may be box-shaped, disk-shaped, or ellipsoid-shaped.

The present invention uses magnetic inductive field technology in an office environment. The falloff characteristics and the shape of the field allow the transmit power of the base unit to be reduced for a given coverage area compared to RF and/or omnidirectional systems. In addition, the battery requirements of the remote unit are reduced. Interference between adjacent systems is reduced. A lower number of discrete channels are required in a high user density environment to thereby reduce the spectral allocation required by the system. An aerial array provides such shaping of the field. The aerial array may include aerials such as those described above.

The communication link may provide rotating magnetic inductive fields that are tilted by phase shifting and amplitude modulating the currents applied to the aerials.

Using the aerial arrays, a communication cluster system transmit data to remote units in a first region and receive data from second regions that are smaller from the first region so users in the same environment can operate on the same frequency.

BRIEF DESCRIPTION OF THE DRAWINGS

FIGS. 10a and 10b are top and side plan views, respectively, of the magnetic inductive aerial in accordance with another embodiment of the present invention.

FIGS. 11a-11b are transverse cross-sectional an top plan views, respectively, of the magnetic inductive aerial of the remote unit in accordance with another embodiment of the present invention.

DESCRIPTION OF THE PREFERRED EMBODIMENTS

Figure 1:
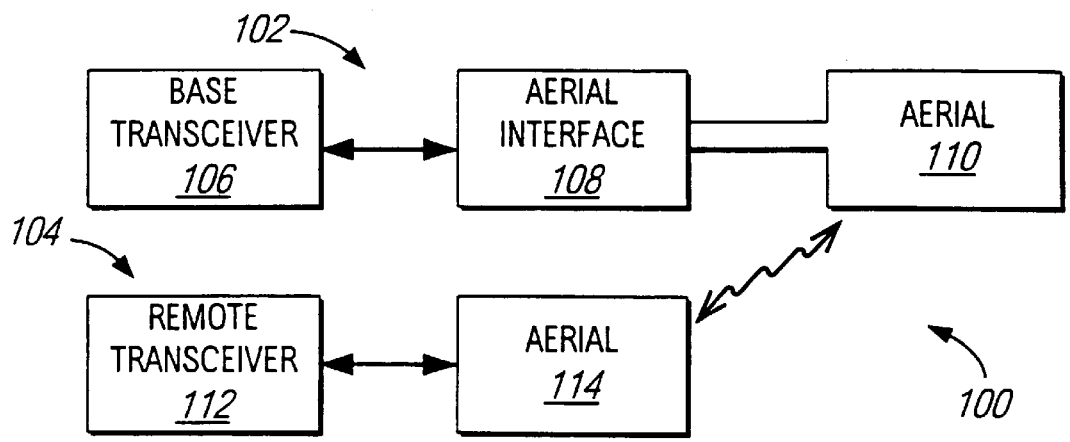
FIG. 1 is a block diagram illustrating a communication system using a magnetic inductive aerial.

Referring to FIG. 1, there is shown a block diagram illustrating a communication system 100 using a magnetic inductive aerial. The communication system 100 includes a base unit 102 and a remote unit 104, which form a wireless communication link. The communication system 100 may be, for example, a telephone that includes a wireless communication link between the base unit 102 at a user workstation and the remote unit 104, which is part of an audio headset worn by an operator. A plurality of communication systems 100 may be used, for example, in an office environment. The communication system 100 uses magnetic inductive fields for short range communication between the base unit 102 and the remote unit 104.

The base unit 102 includes a base transceiver 106, a aerial interface 108, and a magnetic inductive aerial 110. The magnetic inductive aerial 110 generates a first magnetic inductive field for communicating data from the base unit 102 to the remote unit 104 and receives a second magnetic inductive field from the remote unit 104. The base unit 102 or only some elements of the base unit 102 (such as the magnetic inductive aerial 110) may be, for example, disposed on or in a desk surface, on a floor mat, in a bench mat, or inside a keyboard. Of course, the aerial 110 may be shaped to the desk, floormat or the like. For example, for an "L" or "U" shaped desk, the aerial 110 may be extended around the comers along the next length of desk, or alternatively, an additional loop may be added to the aerial 110.

The magnetic inductive aerial 110 preferably is a rectangular loop aerial with a length substantially greater than the width. To provide the "near effect" for telephone headsets, the length of the magnetic inductive aerial 110 is approximately ten times the width of the magnetic inductive aerial 110, and the height of the magnetic inductive aerial 110 is approximately ten times the depth of the magnetic inductive aerial 110.

The remote unit 104 includes a remote transceiver 112 and a magnetic inductive aerial 114. The magnetic inductive aerial 114 generates the second magnetic inductive field for communicating data from the remote unit 104 to the base unit 102 and receives the first magnetic inductive field from the magnetic inductive aerial 110. The magnetic inductive aerial 114 may be one of the various embodiments described below.

The size of the magnetic inductive aerials 110 and 114 is small relative to the operating range of such aerials.

For an aerial where the Biot-Savart law applies (i.e., a quasi static field away from a conductive medium), a small loop aerial provides a magnetic inductive field that falls off inversely with the cube of the distance. It is an aspect of the present invention that by significantly extending one dimension of the loop relative to the separation between the aerials 110 and 114, or the range to the user, the magnetic inductive field will have a linear falloff at short ranges and a cube falloff at long ranges due to the very "near field" effects of the loop. This allows the length and the drive level to vary to change the field strength and to control the shape of a footprint of the aerials. The footprint is the area in which the system operates. The footprint is defined by a line of equipotential having a field strength indicative of the operation of the system.

Mathematically, at long ranges, the magnetic field strength (Hz) along a z-axis perpendicular to the center of the loop is described by the equation:

$$H_z = \left(\frac{I}{\pi}\right) \frac{ab}{\sqrt{a^2 + b^2 + z^2}} \left(\frac{1}{a^2 + z^2} + \frac{1}{b^2 + z^2}\right) \quad (1)$$

where the rectangular loop is in the x-y plane with dimensions a, b on each side of the origin of the x and y axes, respectively, and I is the current flowing through the loop. The magnetic field strength components ($H_x$, $H_y$) in the x and y directions, respectively, of the field along the z axis, are zero.

If one dimension of the loop, say "a" is extended, such that $$H_Z = \frac{1b}{\pi Z^2} \qquad (2)$$

The field is stronger and the rate of decay is reduced.

The effect can be seen by comparing the fields of a loop of dimensions 50×40×1 cm with that of a solenoid coil 1 cm in diameter by 2.5 cm in length.

If each generates the same field of the origin, that of the extended loop will be about 20 times higher at a range of 10 cm.

To obtain the same field from the solenoid would require 20 times the united field strength, with power implications and regulatory issues.

For movement in the x axis, assume that the loop aerial lies parallel to the front of a desk. As the user moves along the front of the desk, the user moves parallel to the long axis of the loop aerial and thereby remains in a magnetic inductive field of substantially constant strength. The quality of the communication over the link is maintained in this dimension by extending the length of the loop instead of by increasing the field strength of a point source.

A loop as the aerial 110 provides a single winding air core conductor that may be shaped to conform to a workstation and integrated with the workstation or a desk on which the workstation rests. A loop also allows the range of the aerial to be extended without increasing the drive power from the base transceiver 106. As noted above, the loop allows the decay of the footprint over a range from the aerial 110 to be controlled to give the desired performance in an area around the aerial 110 and to have a desired fall in signal levels outside the area.

Figure 2:
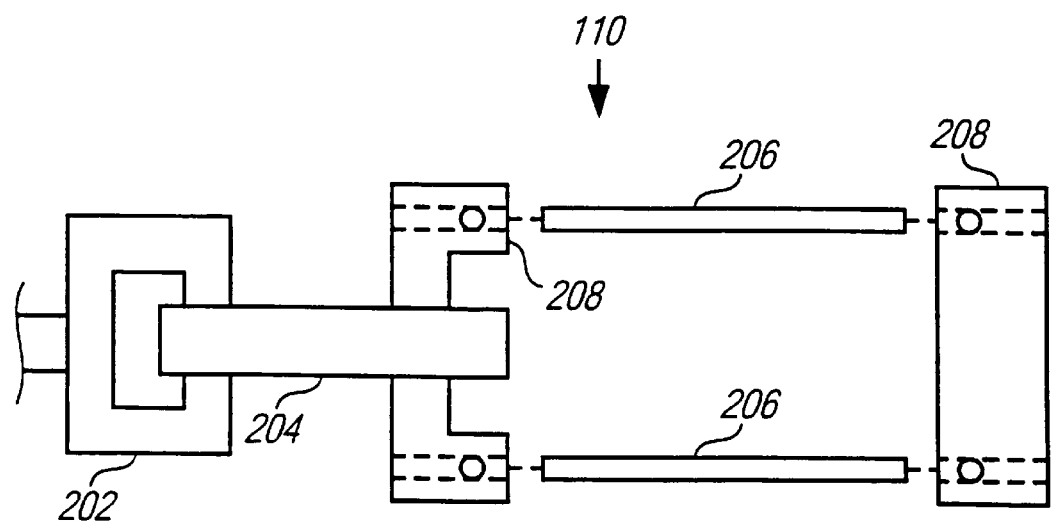
FIG. 2 is a block diagram of an aerial interface of the communication system of FIG. 1.

Referring to FIG. 2, there is shown a block diagram illustrating the aerial interface 108 of the communication system 100. The aerial interface 108 includes a drive coil 202 and a permeable core 204. The drive coil 202, magnetic core 204, and aerial loop 110 constitute a transformer with a short-circuited, single-turn secondary. The drive coil 202 may be disposed adjacent a driver circuit (not shown) in the aerial interface 108 or may be disposed remote from the driver circuit and connected by a cable (not shown). The drive coil 202 receives a current containing the data to be communicated from the base transceiver 106 and generates a field which is inductively coupled through the core 204 to the magnetic inductive aerial 110. The magnetic inductive aerial 110 shown in FIG. 2 is one embodiment of the aerial 110. The magnetic inductive aerial 110 may be formed, for example, by rods 206 formed from conductive material, such as aluminum, which are inserted into holes in blocks 208 formed from conductive material, such as aluminum. Alternatively, the magnetic inductive aerial 110 may be formed, for example, of self adhesive foil or self adhesive flexible printed circuit board. The shape of the loop may be altered to conform with the physical shape of the workstation. By forming the loop of a flexible material, the shape of the loop may be formed at the time of installation.

Figure 3:
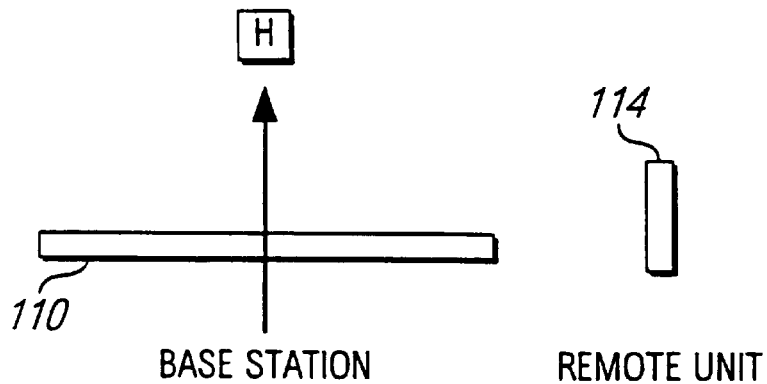
FIG. 3 is a side view illustrating the orientation of the magnetic inductive field in accordance with a first embodiment of the magnetic inductive aerial.

Referring to FIG. 3, there is shown a side view illustrating the orientation of the magnetic inductive field in accordance with a first embodiment of the magnetic inductive aerial. The magnetic inductive aerial 110 is a air core loop aerial. In the view of FIG. 3, the magnetic inductive aerial 110 is perpendicular to the view shown and has a major axis in the horizontal plane. The magnetic inductive aerial 110 generates a magnetic inductive field that has a flux line in the center of the aerial 110 vertical to the horizontal plane of the aerial 110. Although not shown for simplicity, the flux lines of the magnetic inductive field loop around the aerial 110 to close on themselves. The magnetic inductive aerial 114 may be, for example, a permeable cored solenoid aerial. The windings of the magnetic inductive aerial 114 are perpendicular to the longitudinal axis of the aerial. When the longitudinal axis of the magnetic inductive aerial 114 is parallel to a center axis of the magnetic inductive aerial 110 and the magnetic inductive aerial 114 is in the same horizontal plane as the magnetic inductive aerial 110, the coupling between the magnetic inductive aerial 114 and the magnetic inductive aerial 110 is maximized. As the longitudinal axis of the magnetic inductive aerial 114 is rotated, the coupling reduces until it is zero when the longitudinal axis of the magnetic inductive aerial 114 is perpendicular to the center axis of the magnetic inductive aerial 110. As the magnetic inductive aerial 114 is elevated above or lowered below the plane of the magnetic inductive aerial 110, the coupling between the magnetic inductive aerial 114 and the magnetic inductive aerial 110 is reduced. Such coupling is analogous to a vertically polarized RF system.

Figure 4:
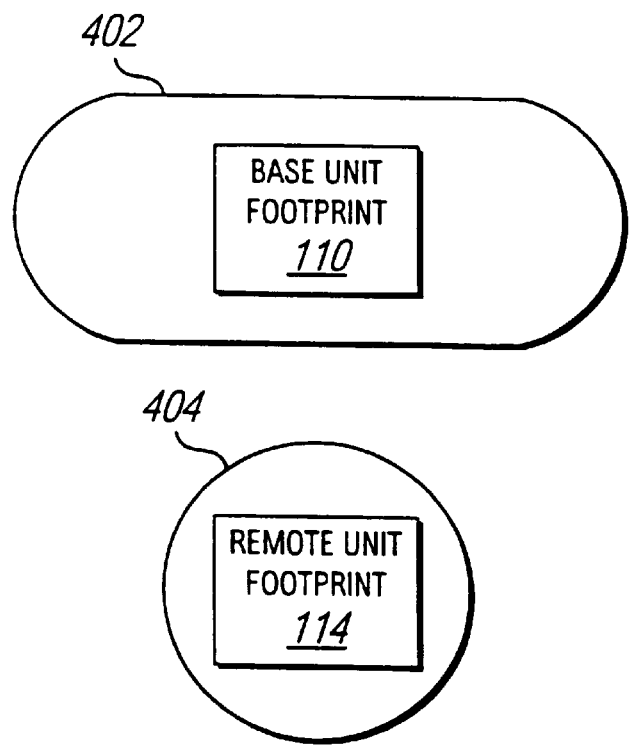
FIG. 4 is a top plan view illustrating the response area for the base unit and the remote unit of FIG. 3.

Referring to FIG. 4, there is shown a top plan view illustrating the response area for the base unit 102 and the remote unit 104 of FIG. 3. The base unit 102 has a response area 402 that is elongated. The remote unit 104 has a response area 404 that is circular.

Figure 5:
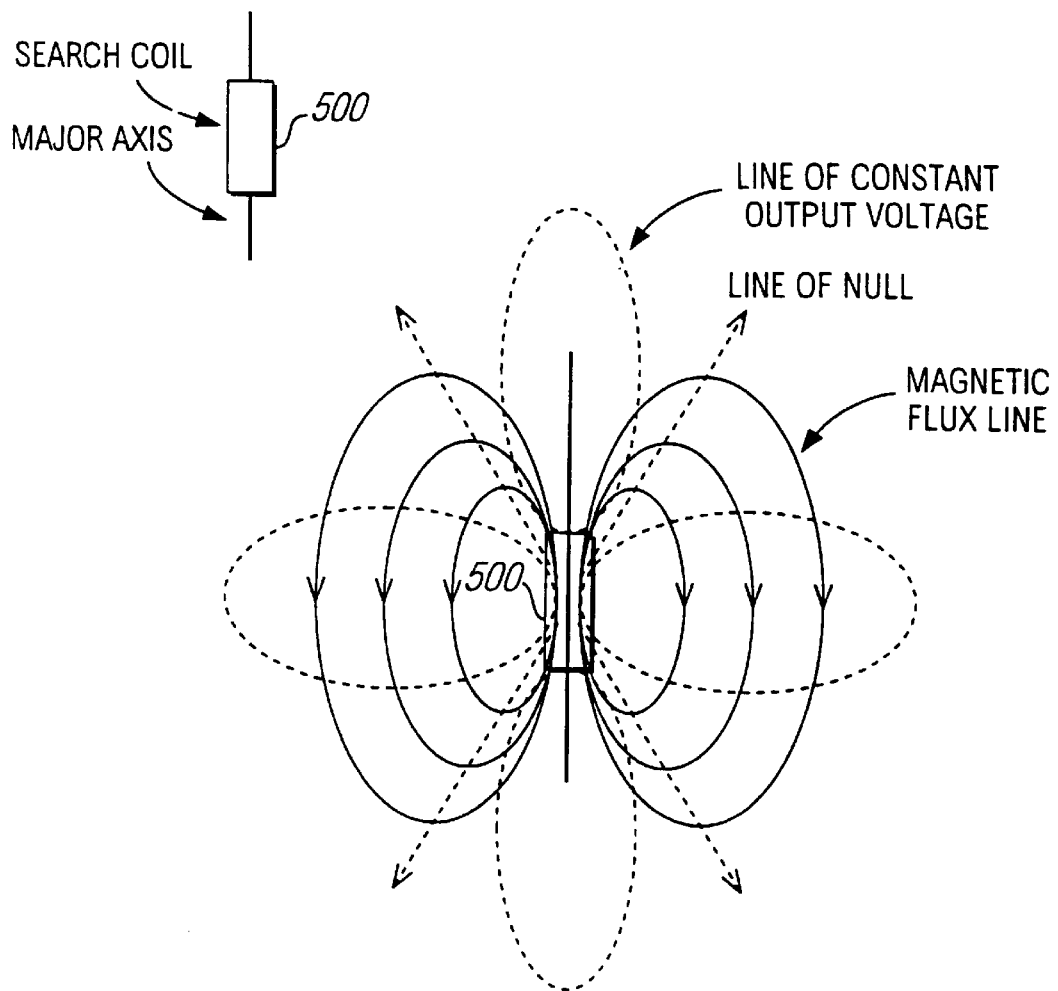
FIG. 5 is a schematic view illustrating the magnetic inductive field lines and null responses of a solenoid aerial.
Figure 6:
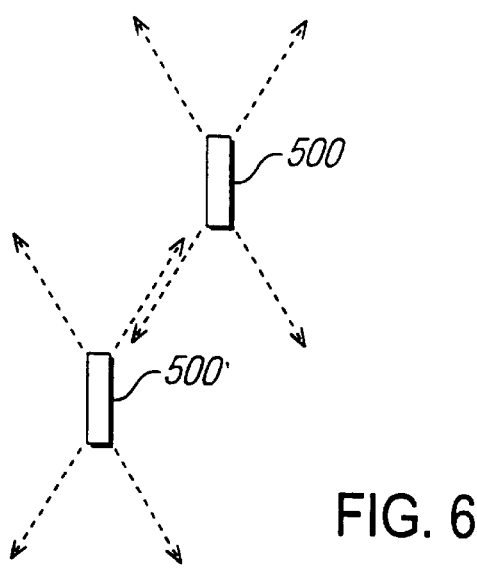
FIG. 6 is a schematic view illustrating the mutual nulling of a pair of solenoid aerials.

Referring to FIG. 5, there is shown a schematic view illustrating the magnetic inductive field lines and null responses of a solenoid aerial 500. Referring to FIG. 6, there is shown a schematic view illustrating the mutual nulling of a pair of solenoid aerials. A system using the same aerial for transmitting and receiving has a more complex filter at the receiver input. However, in one embodiment, the head set aerial 114 includes a pair of parallel solenoid aerials 500. The solenoid aerial 500 provides null coupling between parallel aerials so that one aerial may be used as a receive aerial without picking up transmissions from the other aerial which may be used as a transmit aerial. This eliminates the need for filtering the signal from the receive aerial which would filter the higher signal levels of the transmit signal. The solenoid aerial has lines joining points of constant induced voltage in a search coil having a major axis parallel to that of the transmitting aerial that extend from the solenoid aerial that have peaks in a plane perpendicular to the longitudinal axis of the solenoid and peaks that have a maximum along the longitudinal axis. The lines of constant voltage have null lines that are along conical surfaces that are approximately 45° to the longitudinal axis. By placing two solenoid aerials along the null line of the other solenoid aerial, the two solenoid aerials are mutually nulled. Of course, the base unit aerial 110 may include a pair of parallel solenoid aerials 500 that are mutually nulled.

Figure 7:
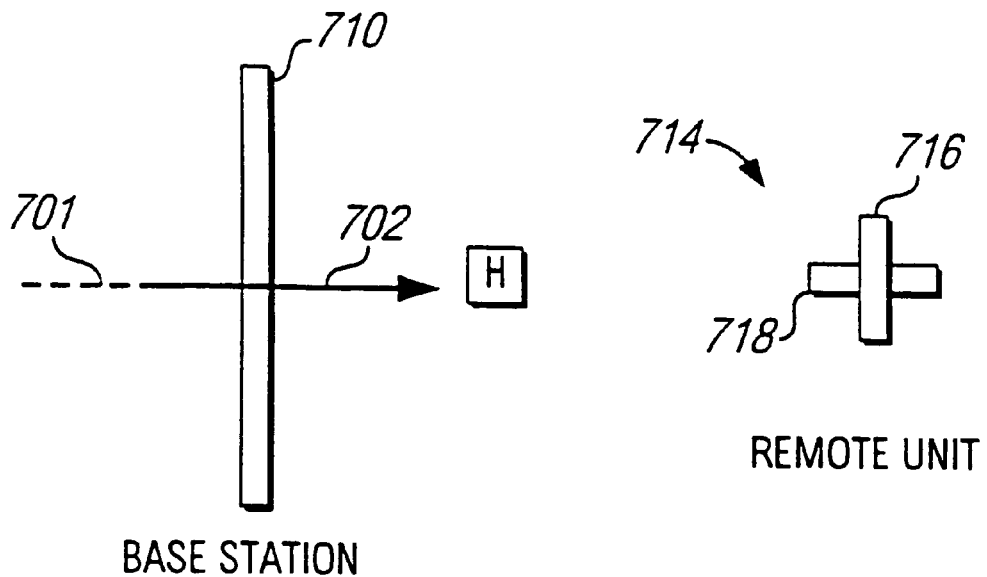
FIG. 7 is a side view illustrating the orientation of the magnetic inductive field in accordance with a second embodiment of the magnetic inductive aerial.

Referring to FIG. 7, there is shown a side view illustrating the orientation of the magnetic inductive field in accordance with a second embodiment of the magnetic inductive aerial. The magnetic inductive aerial 710 is an air core loop aerial. In the view shown in FIG. 7, the magnetic inductive aerial 710 is perpendicular to the view shown and has a central axis 701 in the horizontal plane. The magnetic inductive aerial 710 generates a magnetic inductive field that has a flux line 702 in the center of the aerial 710 vertical to the plane of the aerial 710. Although not shown for simplicity, the flux lines of the magnetic inductive field loop around the aerial 710 to close on themselves.

The magnetic inductive aerial 714 is a crossed horizontal aerial that includes first and second solenoid aerials 716 and 718, which are perpendicular to each other. Specifically, the solenoid aerials 716 and 718 include a ferrite permeable core, and includes loops (not shown) disposed on the permeable core that are perpendicular to the longitudinal axis of the solenoid aerial. When the longitudinal axis of the solenoid aerial 718 is parallel to the center axis 701 of the magnetic inductive aerial 710 and the solenoid aerial 718 is in the same horizontal plane as the magnetic inductive aerial 710, the coupling between the solenoid aerial 718 and the magnetic inductive aerial 710 is maximized. As the solenoid aerial 718 rotates, and thus as the longitudinal axis of the solenoid aerial 714 rotates, the coupling reduces until it is zero when the longitudinal axis of the solenoid aerial 718 is perpendicular to the center axis 701 of the magnetic inductive aerial 710. Of course, the coupling of the solenoid aerial 716 functions in the reverse direction with the coupling increasing from zero to maximum coupling during the 90° rotation. As the solenoid aerial 718 is elevated above or lowered below the plane of the magnetic inductive aerial 710, the coupling between the solenoid aerial 718 and the magnetic inductive aerial 710 is reduced. Such coupling of the solenoid aerial 716 is analogous to a horizontally polarized RF system.

The aerial 714 preferably is used in applications in which it is necessary to avoid the nulls of the aerial, which are in a line at about 45° from the major axis by the geometry of FIG. 6, and where it is necessary to avoid the nulls that occur if the user rotates, for example, in a swivel chair.

The signals received by the solenoid aerials 716 and 718 preferably are summed vectorally and provided to the remote transceivers of the remote unit 104.

Alternatively, for the simpler embodiment, the remote transceivers of the remote unit 104 may process the signal from the solenoid aerials 716 and 718 having the greatest magnitude.

The aerial 714 receives a signal that is twice the signal received by the aerial 114 (FIG. 3). The aerial 714 also has twice. the sensitivity. Thus, the aerial 714 provides a 12 dB signal advantage over the aerial 114. In some applications, this increased performance would justify the extra complexity of combining the signals from 716 to 718.

In a horizontal magnetic field system, if the range of the fields behind the base unit 102 encroaches an area required by another system, the aerial 710 may be tilted so that the field behind the base unit 102 is directed downward toward the floor to reduce the encroachment.

In a vertical magnetic field system, the aerial of the base unit 102 may be rotated slightly about the major axis to avoid the geometry described above in conjunction with FIG. 6, such as may occur when the user stands up.

Figure 8:
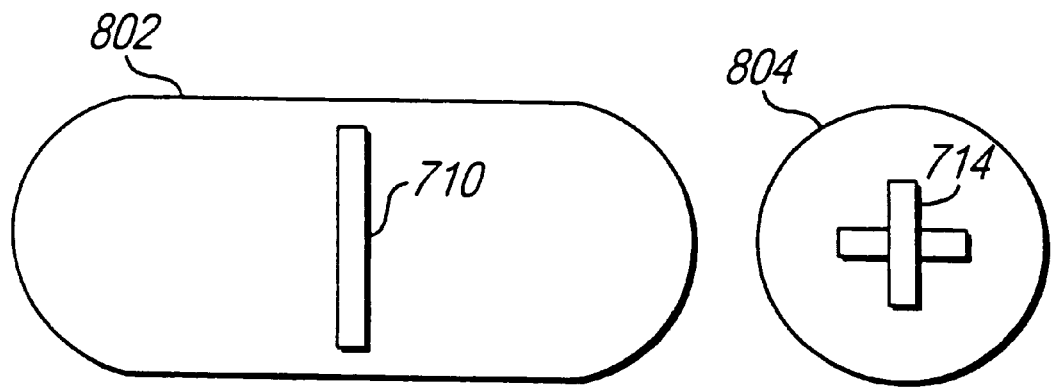
FIG. 8 is a top plan view illustrating the response area for the base unit and the remote unit of FIG. 7.

Referring to FIG. 8, there is shown a top plan view illustrating the response area for the base unit 102 and the remote unit 104 of FIG. 7. The base unit 102 has a response area 802 that is elongated. The remote unit 104 has a response area 804 that is circular.

Figure 9:
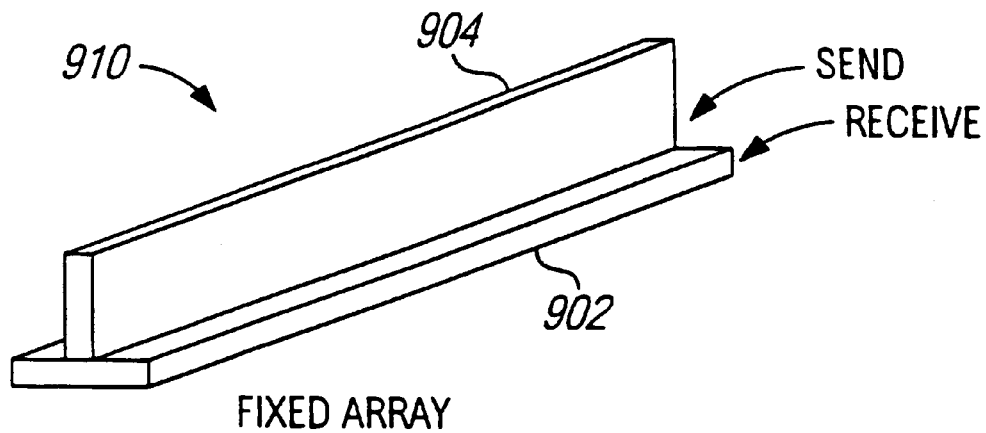
FIG. 9 is a partial perspective view of the magnetic inductive aerial of FIG. 1 in accordance with another embodiment of the present invention.
Figure 9:
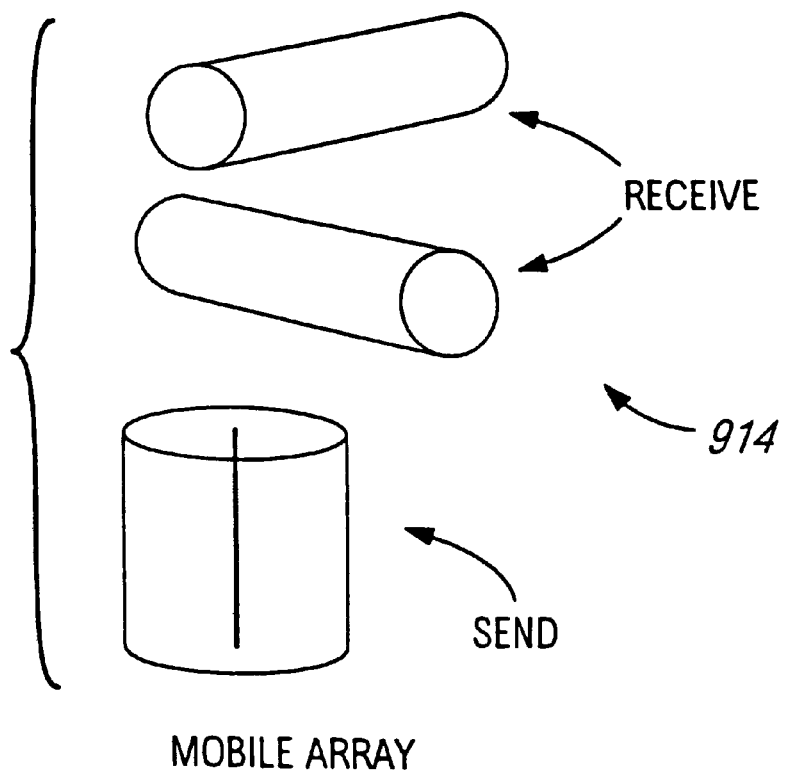

Referring to FIG. 9, there is shown a partial perspective view of the magnetic inductive aerial 910 and an exploded view of the magnetic inductive aerial 914. The magnetic inductive aerial 910 generates a magnetic inductive field having a first orientation (e.g., horizontal) for transmissions and receives a magnetic inductive field having a second orientation (e.g., vertical) that is orthogonal to the first orientation. The magnetic inductive aerial 910 includes a receive aerial 902 having a loop shape, such as described above for the aerial 110 (FIG. 1) and having a rectangular transverse cross section, and also includes a transmit aerial 904 having a loop shape and having a rectangular transverse cross section. The shorter surface of the transmit aerial 904 is disposed on the longer surface of the receive aerial 902 to form a T-shape transverse cross section. The mutual inductance between the receive aerial 902 and the transmit aerial 904 is low, ideally zero. This provides a second, preferred method for isolating transmitted signals form the receiver input and reducing the demands on input filters with commensurate savings in cost and power consumption.

The magnetic inductive aerial 914 generates a magnetic inductive field having a first orientation (e.g., vertical) for transmissions and receives a magnetic inductive field having a second orientation (e.g., horizontal) that is orthogonal to the first orientation. The magnetic inductive aerial 914 includes a crossed horizontal aerial for receiving and a vertical aerial for transmitting. The cross horizontal aerial includes first and second solenoid aerials perpendicular to each other. The solenoid aerials are similar to the solenoid aerials 716 and 718 described above in conjunction with FIG. 7. Specifically, the solenoid aerials include a ferrite permeable core and includes loops disposed on the ferrite core. The vertical aerial may be, for example, a solenoid aerial.

Various embodiments for the aerial 114 of the remote unit 104 are now described. In a remote unit that is used as a user telephone headset, the aerial 114 preferably is compact and light weight. As a development of the array 914, the aerial 114 preferably includes twin or triple axis aerials disposed on a single permeable core to provide sensitivity and frequency response that is matched for each aerial. A tri-axis aerial may be formed by combining three single axis aerials as 914, a single axis aerial with a dual axis aerial, or three windings on a single permeable core. A tri-axis aerial is described below in conjunction with FIG. 23.

Referring to FIGS. 10a and 10b, there are shown top and side plan views, respectively, of a twin-axis magnetic inductive aerial 1000 for the remote unit 104 in accordance with another embodiment of the present invention. The twin-axis magnetic inductive aerial 1000 includes a permeable core 1002 and first and second windings 1004 and 1006. The core 1002 is box shaped and formed of ferrite. The first winding 1004 is disposed on the surface of the core 1002 in a first plane. The second winding 1006 is disposed in a second plane perpendicular to the first plane. The windings 1004 and 1006 are oriented to minimize mutual inductance. The physical construction of the windings 1004 and 1006 provide this minimization which negates any need for additional mechanical fixing or adjustment, for nulling. In most applications, such a structure is therefore described as self-nulling. The dimensions of the core 1002 are selected so that the windings 1004 and 1006 have substantially identical inductance and capacitance.

Referring to FIGS. 11a-11b, there are shown cross sectional and top plan views, respectively, of the magnetic inductive aerial 1100 in accordance with another embodiment of the present invention. The magnetic inductive aerial 1100 includes a permeable core 1102 and first and second windings 1104 and 1106, respectively. The permeable core 1102 is disk-shaped and formed of ferrite. The first and second loops 1104 and 1106 are disposed in respective planes perpendicular to the flat surface of the permeable core 1102 and preferably perpendicular to each other. Flux enters and exits the permeable core 1102 perpendicular to the surface of the core 1102. The round surfaces facilitate the capture and routing of flux through the loops 1104 and 1106, which allows the aerial 1100 to function better over angles of rotation of the remote unit 104. The flux in the core 1102 can be algebraically added to provide a similar result to vector addition of the outputs of other dual axis aerials. Because vector addition is more complex, the core 1102 more simply provides a similar result.

Alternatively, the permeable core may be ellipsoid shaped, and the first and second loops are disposed in respective planes perpendicular to each other. Such a shaped core is less sensitive to rotation about an axis in the major plane.

Figure 12:
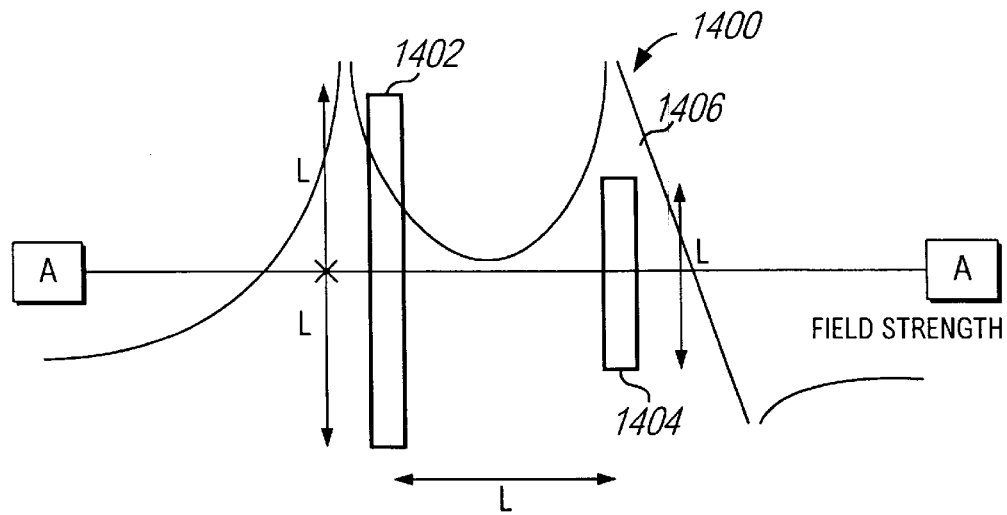
FIG. 12 is a top plan view illustrating an aerial array in accordance with another embodiment of the present invention.

Referring to FIG. 12, there is shown a top plan view illustrating an aerial array 1400 in accordance with another embodiment of the present invention. The aerial array 1400 reduces the transmitted field and the receive sensitivity of a base unit 102 in an inductive communication system 100 in the area behind the aerial array 1400, and also reduces the field and sensitivity to the sides of the aerial array 1400. Accordingly, this allows units in multi-user communication systems to be spaced closer together to thereby reduce the required spectrum allocation of such systems for a given density of users. The aerial array 1400 may be used instead of the magnetic inductive aerial 110 described above. The aerial array 1400 is described for a horizontal field. Of course, the aerial array 1400 may be formed to operate for a vertical field.

The aerial array 1400 includes a main aerial 1402 and an auxiliary aerial 1404. The main aerial 1402 and the auxiliary aerial 1404 generate first and second magnetic inductive fields, respectively. Each aerial 1402 and 1404 of the aerial array 1400 preferably is one of the aerials described above, such as the aerial 910, which includes both transmit and receive aerials. The aerials 1402 and 1404 are preferably air cored coils having a length that is significantly greater than the height. For example, the coil may be rectangular with the ratio of length to height at least five to one and a ratio of height to depth in the order of ten to one. The major axis of the aerials 1402 and 1404 are positioned in the horizontal plane and the flux in the center of these aerials is directed horizontally to provide maximum coupling to a horizontal solenoid aerial in the remote unit. The main aerial 1402 is spaced apart from the auxiliary aerial 1404 at a distance at which the sum of the first and second magnetic inductive fields is directional. The auxiliary aerial 1404 is shorter than the main aerial 1402 so that the field from the auxiliary aerial 1404 decays faster than the field from the main aerial 1402.

The auxiliary aerial 1404 is driven in antiphase to the main aerial 1402 to reverse the flux direction from the aerials and to draw in the fields to the sides of the main aerial 1402 and thereby produce a shaped or focused field for the array 1400. The field strength of the summed fields along the central axis is shown as line 1406. Behind the aerial array 1400, the field from the auxiliary aerial 1404 substantially cancels the field from the main aerial 1402. The same configuration may be used as receiving array.

The outputs of the receive coils may be summed in antiphase to produce a null on the main axis behind the aerial array 1400 in a manner similar to the transmit aerial. The relative gain between the two aerials may be varied to move the position of the null. The directed fields reduce interference between proximate systems.

Of course, the aerial array 1400 may be shaped to conform to the workstation in a manner similar to the aerial 110 described above.

The aerial array 1400 allows the decay vs. range profile of the base station 102 to be altered to conform to a desired area with optimal performance in the desired area and with significant reduction in signals outside this area. As the null behind the aerial array 1400 moves further behind the array 1400, the near field increases and the far field decreases.

Figure 13A:
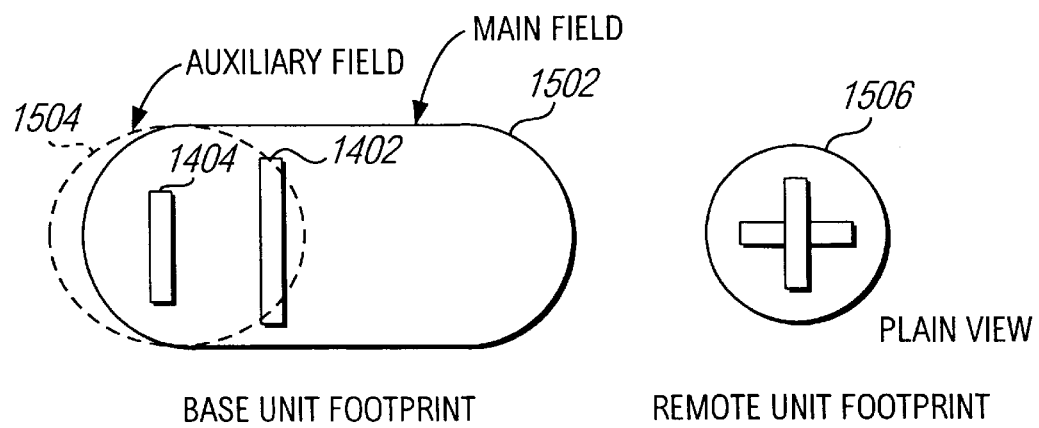
FIG. 13a is a top plan view illustrating the response area for a remote unit and a base unit that includes the aerial array of FIG. 12.

Referring to FIG. 13a, there is shown a top plan view illustrating the response area for a remote unit and a base unit that includes the aerial array of FIG. 12. The aerial 1402 has a response area 1502 that is elongated and extends out further in the front of the base unit 102 than the extension in the back of the base unit 102. The aerial 1404 has a response area 1504 that is elongated and that does not extend significantly beyond the aerial 1402 toward the front of the response area 1504. The remote unit 104 has a response area 1506 that is circular.

Figure 13B:
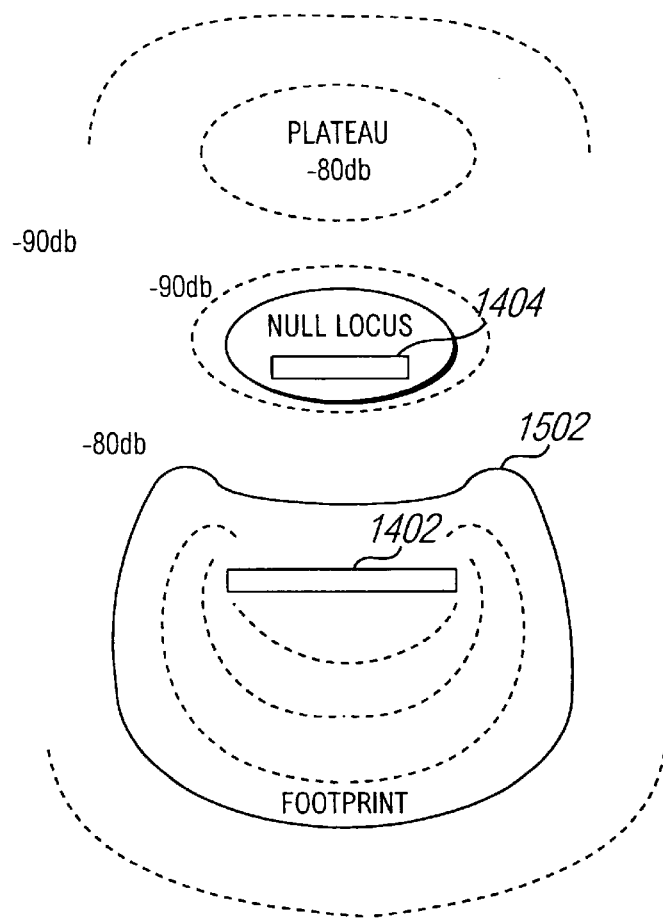
FIG. 13b is a top plan view illustrating the response area of the aerial array of FIG. 12 for the aerials of the aerial array driven in antiphase.

Referring to FIG. 13b, there is shown a top plan view illustrating the response area of the aerial array 1400 for the aerials of the aerial array driven in antiphase. The aerial array 1400 provides a cardiod footprint 1502 when the aerials 1402 and 1404 are driven in antiphase. The fields from the aerials 1402 and 1404 cancel behind the aerial array 1400.

Figure 14:
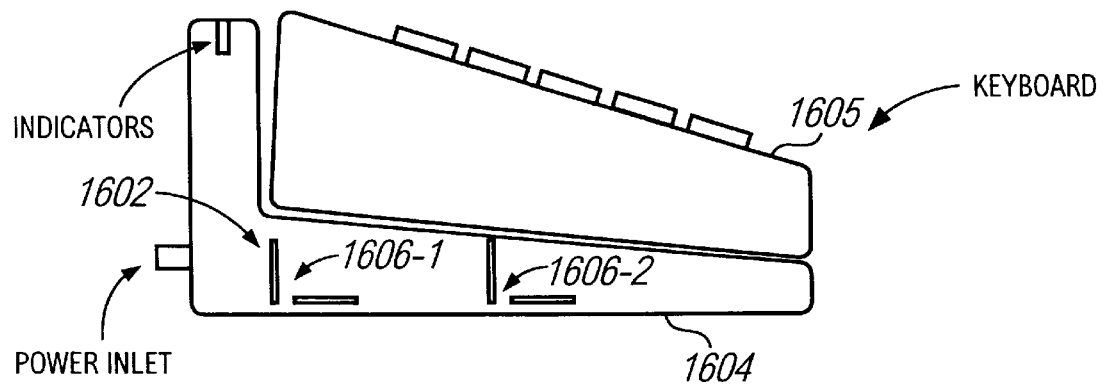
FIG. 14 is a cross-sectional view of a keyboard including the aerial array of FIG. 12 in accordance with another embodiment of the present invention.

Referring to FIG. 14, there is a cross-sectional view of a keyboard 1600 including an aerial array 1602 in accordance with another embodiment of the present invention. Although FIG. 14 shows the keyboard 1600 as including only an aerial for the base unit 102, the keyboard 1600 may include other elements of the base unit 102. The keyboard 1600 includes the aerial array 1602, a base plate 1604, and a keypad 1605. The aerial array 1602 is disposed on the top surface of the base plate 1604 and below the keypad 1605. The aerial array 1602 includes a pair of crossed aerials 1606 -1 and -2. Each crossed aerial 1606 may be circuit traces disposed on the surface of a pair of printed circuit boards (not shown) that are orthogonal to each other. Alternatively, the aerials 1606 may be the magnetic inductive aerial 910 (FIG. 9). The array 1602 may be tilted to direct the fields.

Communications systems using steered rotating fields are now described. Using steered rotating fields, the communication link of the inductive communication system avoids the occurrence of orientations that produce zero mutual inductance or nulls between the fixed and movable aerials or aerial arrays. This allows common seating arrangement of users and provides a system capable of operation in which both units may move and have a random relative orientation.

By way of background, voltage is induced in a receiving aerial when it experiences a changing flux. The change may be produced by varying the magnitude or the direction of the incident field. Alternating the magnitude of a flux in a sinusoidal manner induces a sinusoidal voltage in the receiving aerial. Rotating the incident field at a constant rate will also induce a voltage. The frequency of the induced voltage is the same as the frequency of rotation of the field, which it can be shown is the same frequency as the frequency of the sinusoidal feed to the transmit array.

Referring to FIGS. 15a, 15b, 15c and 15d, there are shown side views of the steered rotating field lines of a crossed aerial array 1700. The crossed aerial array 1700 includes aerials 1702 and 1704, which are orthogonal to each other. A drive current is applied to the aerial 1702. A drive current is applied to the aerial 1704 that is 90° phase shifted from the drive current applied to the aerial 1702 and has the same waveform, to produce a rotating field.

Figure 15A:
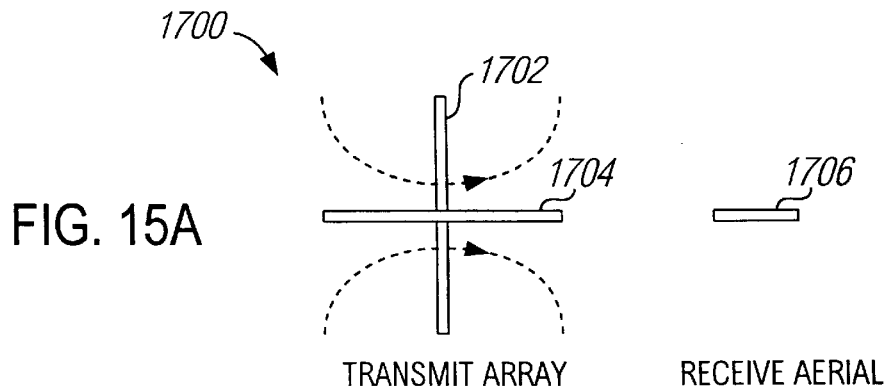
FIGS. 15a, 15b, 15c and 15d are side views of the steered rotating field lines of a crossed aerial array.

Referring specifically to FIG. 15a, the drive current applied to the aerial 1702 generates field lines extending perpendicular to the aerial 1702 in the plane of the aerial 1702. A solenoid receiver aerial 1706 only detects the vector component of field lines directed along the longitudinal axis of the solenoid receiver aerial 1706. Accordingly, a solenoid receiver aerial 1706 aligned with the field lines detects the maximum signal.

Figure 15B:
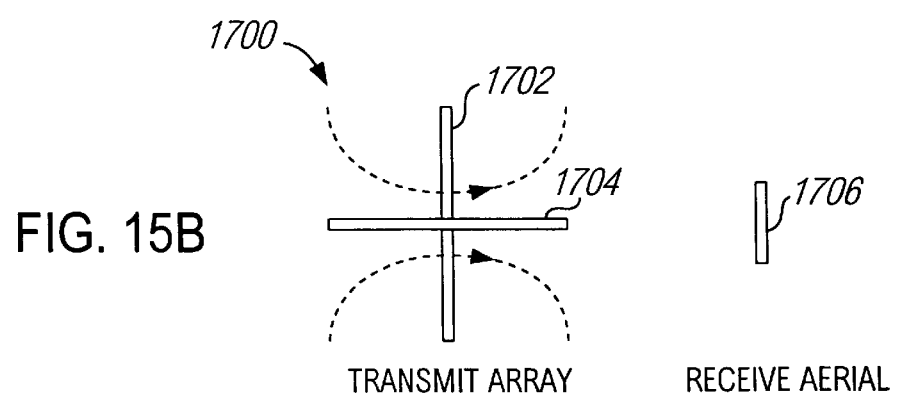

Referring specifically to FIG. 15b, the solenoid receiver aerial 1706 is rotated 90° relative to the orientation of FIG. 15a. The solenoid receiver aerial 1706 is aligned perpendicular to the fields lines and detects the minimum signal from the aerial 1702. If no current is applied to the aerial 1704, the solenoid in this orientation is in a null of the aerial 1702. If the aerial 1704 were driven instead of 1702, then 1704 would experience maximum coupling to the field. The drive current applied to the aerial 1704 generates field lines extending perpendicular to the aerial 1704 in the plane of the aerial 1704.

For a static field and with the orientation shown in FIG. 15b, the solenoid receiver aerial 1706 is in a null. On the other hand, for a rotating field, the aerial 1706 is in a null at one time, but has maximum coupling at another time so that voltage is induced in the aerial 1706. A single axis aerial in the plane of rotation of a rotating field does not experience nulls.

Figure 15C:
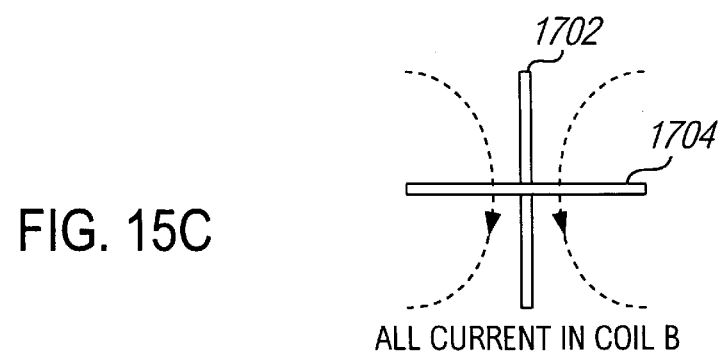

Referring specifically to FIG. 15c, the drive current applied to the aerial 1704 generates field lines extending perpendicular to the aerial 1704 in the plane of the aerial 1704. A solenoid receiver aerial 1706 (not shown) oriented as in FIG. 15b is aligned with the field lines and detects the maximum signal. Conversely, a solenoid receiver aerial 1706 (not shown) oriented as in FIG. 15a is not aligned with the field lines and detects the minimum signal.

Figure 15D:
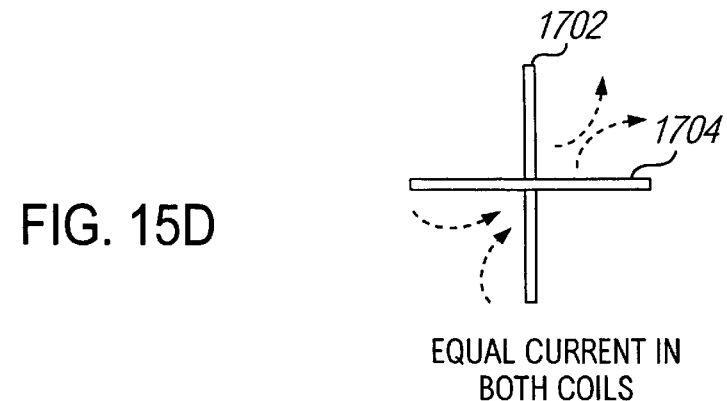

Referring specifically to FIG. 15d, if two alternating signals are provided in phase to the orthogonal aerials, the resultant field is the vector sum of the fields generated by each aerial and has a direction that is changeable by modulating the amplitudes of the fields.

Therefore, in a tri-axis aerial, feeding two coils of the tri-axis aerial creates a rotating field in the horizontal plane as described above in FIGS. 15a and 15b and feeding the third coil with a signal in-phase with one of the two aerials to keep the sum of the signals constant. This causes the plane of the rotating field to tilt.

Figure 16:
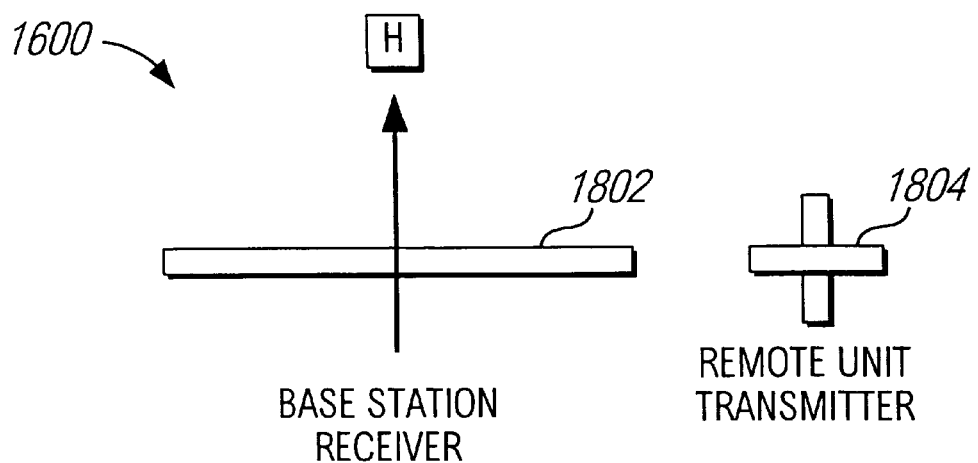
FIG. 16 is a side view of a vertical rotating field communication link in accordance with the present invention.

Referring to FIG. 16, there is shown a side view of a vertical rotating field communication link 1800 in accordance with the present invention. The vertical rotating field communication link 1800 includes a base station receive aerial 1802 in the base unit 102 and a crossed aerial transmit aerial 1804 in the remote unit 104. The crossed aerial transmit aerial 1804 provides a rotating field that rotates in the vertical plane as shown in FIG. 16. Such an aerial 1804 eliminates nulls from vertical displacement in the plane of the transmit and receive aerials. Accordingly, movement in a vertical direction, such as when a user stands up, or if the base unit 102 is on a desk and the user wears the remote unit 104 at chest height, does not cause the remote unit 104 to encounter a null. Thus, the vertical rotating field communication link 1800 provides an advantage over a vertical field system that lacks rotating fields, which avoids nulls in the horizontal plane but has the vertical displacement null problem.

Figure 17:
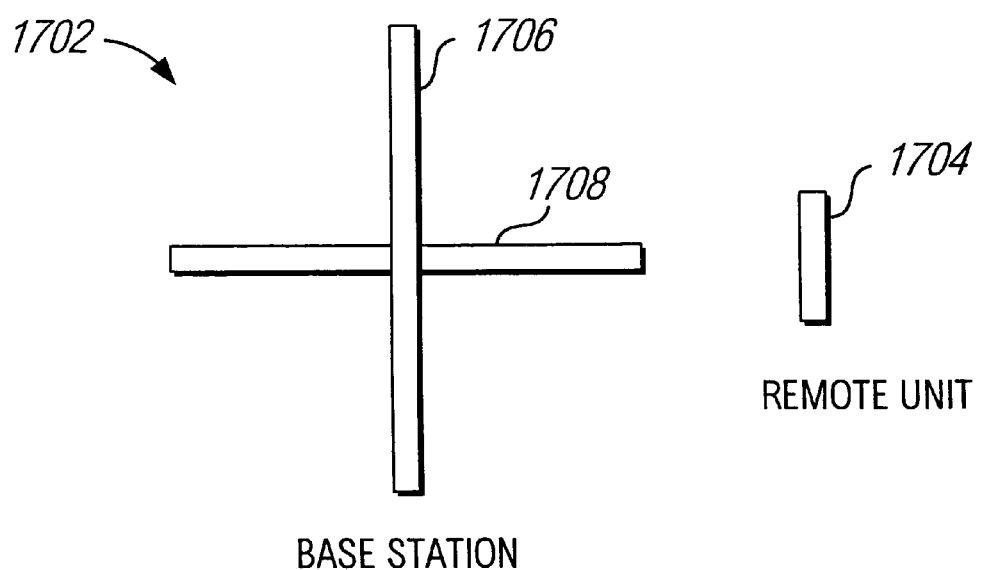
FIG. 17 is a top plan view of a horizontal rotating field communication link in accordance with the present invention.

Referring to FIG. 17, there is shown a top plan view of a horizontal rotating field communication link 1900 in accordance with the present invention. The base unit 102 (not shown) includes a crossed field aerial 1902. The remote unit 104 (not shown) includes a single receive aerial 1904. The crossed field aerial 1902 includes a first aerial 1906 and a second aerial 1908 that is positioned perpendicular to the first aerial. The cross field aerial 1902 provides a rotating magnetic field. By increasing the complexity and bulk of the base unit aerial in the base unit 102, the receive aerial in the remote unit 104 may be more compact and avoids the occurrence of nulls—compared to the system in FIG. 8.

The communication link 100 may use the rotating fields to lock onto a remote unit as described below in conjunction with FIG. 20.

Figure 18:
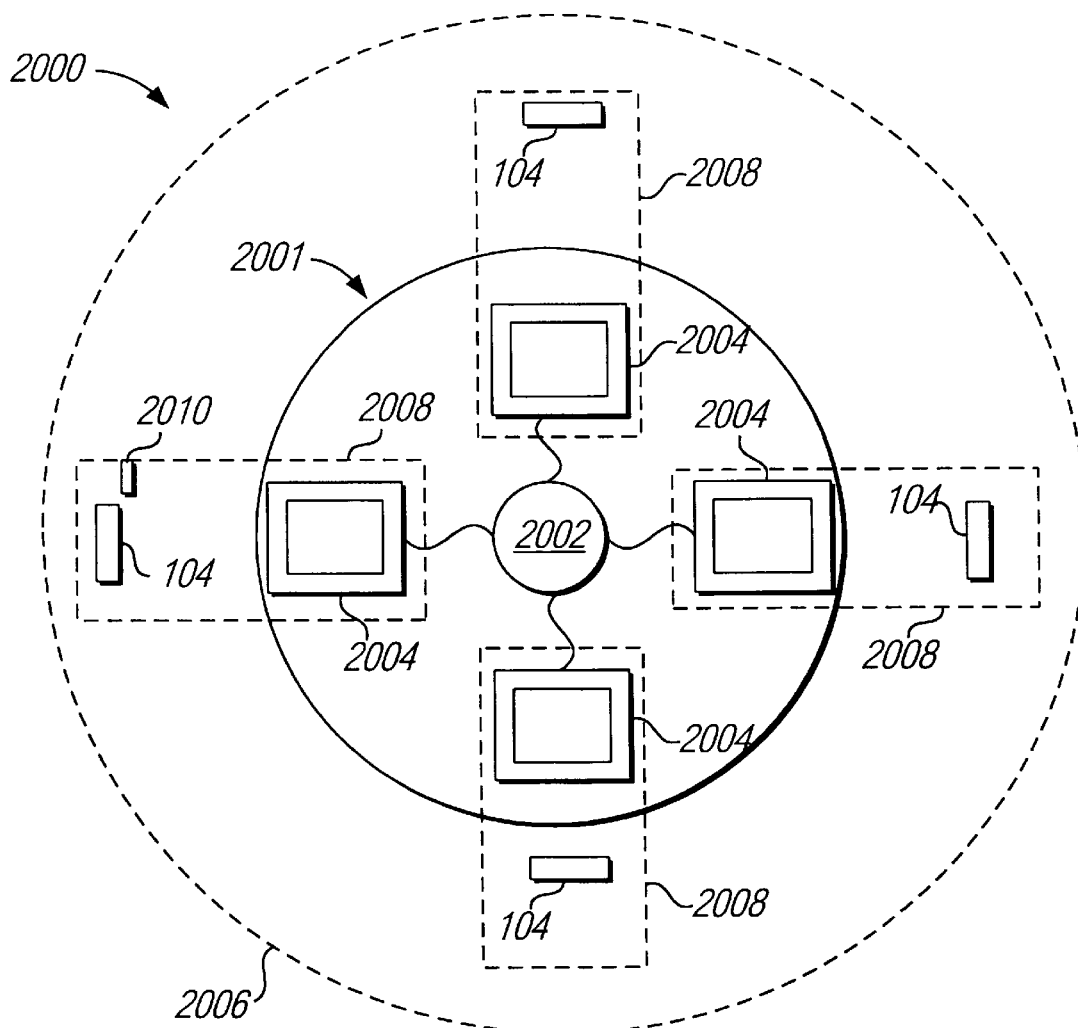
FIG. 18 is a top plan view of a communication cluster system in accordance with the present invention.

Referring to FIG. 18, there is shown a top plan view of a communication cluster system 2000 in accordance with the present invention. The communication cluster system 2000 includes a base unit 2001 and a plurality of remote units 104. The base unit 2001 includes central transmitter 2002 and a plurality of local receive aerials 2004. The central transmitter 2002 provides a first plurality of magnetic inductive fields over a first region 2006 adjacent the central transmitter 2002 to the remote units 104. Each of the first plurality of magnetic inductive fields preferably is a rotating horizontal field. Each field is generated at a different frequency and each remote is tuned to one appropriate frequency.

Each local receive aerial 2004 receives a magnetic inductive field from a remote unit 104 in a second region 2008 adjacent such local receive aerial 2004. In one preferred embodiment, the local receive aerial array 2004 receives magnetic inductive fields that are rotating vertical fields. The local receive aerials 2004 may be, for example, a focused aerial array 1400 (FIG. 12), described above. Each second region 2008 may be smaller than the first region 2006. Each local receive aerial 2004 may have a directional footprint to increase performance in sensitivity and rejection of adjacent user signals as in FIG. 13. Each local receive aerial 2004 is located in an area adjacent a corresponding user. Such locations reduce the power required by the remote unit 104 to extend battery life of the remote unit 104 and to reduce interference between adjacent users.

The central transmitter 2002 includes, in a transmission designated for a remote unit 104, a code uniquely identifying such remote unit 104 in the first plurality of magnetic inductive fields.

The remote unit 104 transmits a field in a vertical plane and receives on a horizontal aerial. With this field orientation, the remote unit 104 in combination with the base unit 2001, which transmits a rotating horizontal field and receives on a vertical field, provide the user with freedom of movement around the communication cluster system 2000. In addition, the remote unit 104 may be compact as a dual axis receive aerial as in FIG. 8 is avoided. The transmit and receive fields of the base unit 2001 and the remote unit 104 are decoupled.

The central transmitter 2002 simultaneously transmits the data to the remote units 104 in the first region 2006. Thus, all signals to the remote units 104 are available in the first region 2006. The communication with said plurality of user remote units 104 and the communication with the monitoring remote unit 2010 are each in a different frequency band. One of the plurality of local receive aerials 2004 communicates with corresponding user remote units 1004 in the second region 2008 adjacent said one of the plurality of local receive aerials 2004 and selectively communicates said communication with user remote units 1004 with a monitoring remote unit 2010 in a second region 2008 adjacent any of the plurality of local receive aerials 2004. A supervisor may use such a monitoring remote unit 2010 to selectively listen to the conversations of any operator while the supervisor is anywhere in the first region 2006 adjacent to the transmitter 2002. The supervisor may selectively monitor all communication made by the communication system 2000 without having to move to any particular portion of the first region 2006.

Figure 19A:
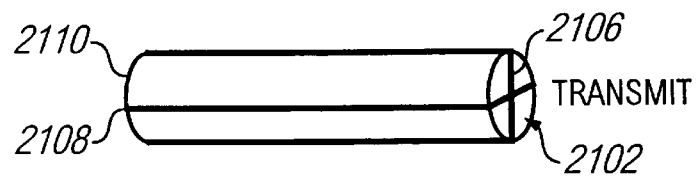
FIGS. 19a and 19b are views of a transmit aerial and a receive aerial, respectively, of a solenoid array.
Figure 19B:
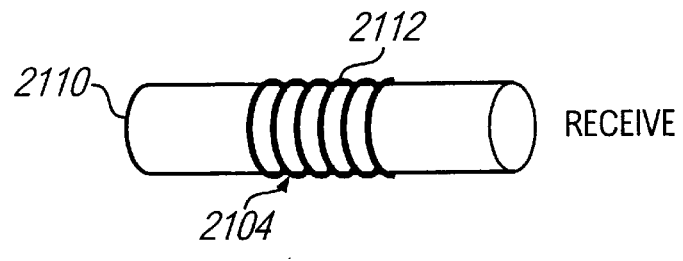

Referring to FIGS. 19a and 19b, there are shown views of a transmit aerial 2102 and a receive aerial 2104, respectively, of a solenoid array 2100. The transmit aerial 2102 includes first and second loops 2106 and 2108 disposed on the surface of a cylindrical core 2110. The first and second loops 2106 and 2108 are disposed in orthogonal planes that intersect along a longitudinal axis of the core 2110. The receive aerial 2104 includes a winding 2112 disposed along the surface of the core 2110 so that the central axis of the winding 2112 is substantially along the longitudinal axis of the core 2110. This provides a receive aerial 2104 that is orthogonal to the transmit aerial 2102 to minimize mutual coupling.

Figure 20:
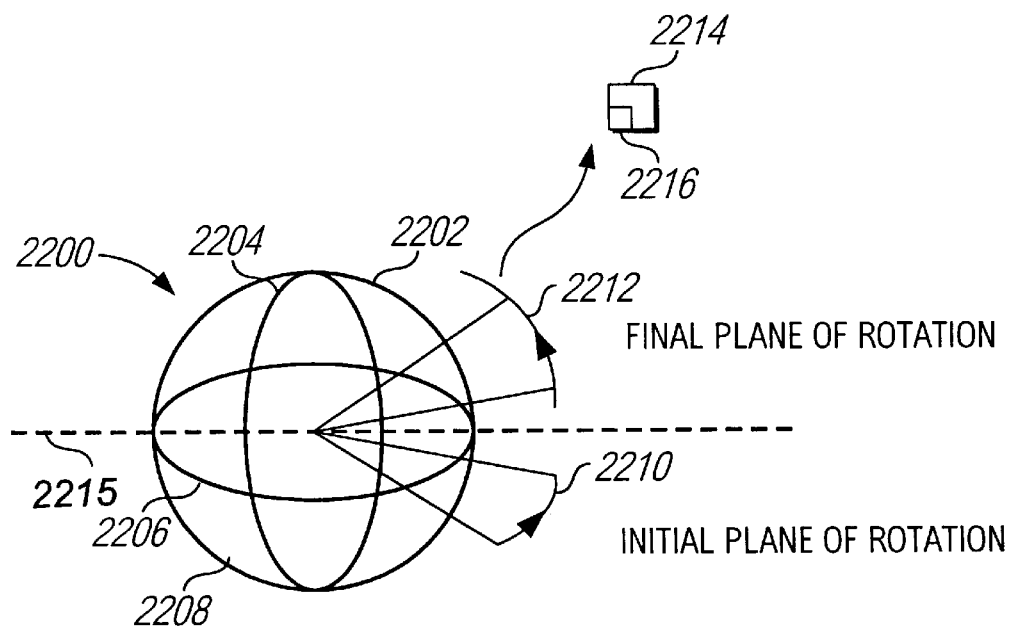
FIG. 20 is a schematic diagram illustrating the geometry and tilting of a plane of rotation, respectively, of a tri-axial transmitting antenna.

Referring to FIG. 20, there is shown a schematic diagram illustrating the geometry and tilting of a plane of rotation, respectively, of a tri-axial transmitting antenna 2200, which includes aerials 2202, 2204, and 2206 and a core 2208. A remote unit 2214 includes a receive aerial 2216. The aerials 2202, 2204, and 2206 are disposed in orthogonal planes on the surface of the core 2208. The tri-axial transmitting antenna 2200 generates a rotating field that is swept through all possible planes. The antenna 2200 scan in space rather than frequency for the presence of a remote unit 2214 within range of the antenna 2200. As described above in conjunction with FIG. 15d, the plane of the field may be tilted by applying the current to the aerials 2202, 2204, and 2206 in phase relative to each other. If driven with currents of equal amplitude and ninety degrees relative phase shift, the aerials 2202 and 2204 produce a field that rotates horizontally in a plane 2210 of the aerial 2206. If an increasing percentage of the current in the aerial 2202 is applied to the aerial 2206, such that the sum of the fields is constant, the plane of rotation is tilted until, when all the current is applied to the aerial 2206 and the current applied to the aerial 2202 is zero, the field rotates vertically in a plane 2212 of the aerial 2202. As shown in FIG. 20, the tilting of the plane is around an axis 2215 linking the points where the aerials 2202 and 2206 touch.

If the current is now progressively reapplied to the aerial 2202, but with reversed polarity, the plane of rotation continues in the same angular direction until the plane is once again horizontal, but having an opposite direction of rotation as the initial condition described above. The 180 degree amplitude modulation of the current applied to the aerials 2202 and 2206 causes the plane of rotation to sweep out a complete 360 degree volume of rotation.

For a receive aerial 2216 that is a dual axis receive aerial, the remote unit 2214 may detect the plane of the received signal and then communicate back to the base unit 102. The base unit 102 may then tilt the plane of its field to maintain optimal coupling between the units. This eliminates the potential for vertical or rotational movement to create nulls in the response and also facilitates a power management system, such as the system 2200 described above, by minimizing transmission path losses.

For a receive aerial 2216 that is a solenoidal receiving aerial, the solenoidal receiving aerial is oriented, during the sweeping process of the transmitting aerial 2200, with its longitudinal axis toward the center of the transmitting aerial 2200 for maximum coupling to the transmitted signal.

For a receive aerial 2216 that is a tri-axis aerial, each coil of the tri-axis aerial provides the vector components of the field passing through the aerial. The tri-axis aerial is onmidirectional and vectorally adds these components to produce an output that corresponds to the output of a solenoidal aerial that automatically aligns itself to the transmitter.

In one embodiment, the remote unit 2214 remains in a passive receive only mode unit the remote unit 2214 detects a search signal from the base unit 102. In this mode, the remote unit 2214 conserves power, which reduces power requirements and thus battery size. The relative strength of the three signals produced by the aerials 2202, 2204, 2206 are the components of the field, in a local Cartesian coordinate system defined by the planes of the aerials 2202, 2204, 2206. As the base unit 102 cycles through a scanning routine, at some time the transmitted signal achieves maximum coupling with the remote unit 2214. At such time, the plane of rotation is aligned with the remote unit 2214 and the sum of the components of the field is at a maximum.

The remote unit 2214 measures the three components and determines the direction of the base unit 102. The remote unit 2214 transmits a carrier in the direction of the base unit 102 to indicate the presence of the remote unit 2214 to the base unit 102. The remote unit 2214 also may transmit a signal indicative of the received signal strength (RSS). In response to the RSS signal, the base unit 102 performs a peak detect and locks the plane of rotation at the appropriate angle. The RSS signal is a signal extract in most receiver designs to operate audio squelch. The RSS signal may be transmitted by a sub-audio tone. The base unit 102 may also use the RSS signal to set the power level of the signal to optimize battery usage by the remote unit 2214.

Alternatively to locking on the RSS signal, the base unit 102 may process the transmitted signal from the remote unit 2214 as three vectors and redirect the transmitted signal from the base unit 102 in response to such vectors.

Once the lock is established, audio information may be transmitted on the same frequencies. This is sufficient when there is little movement between the base unit 102 and the remote unit 2214, such as between two portable appliances such as a computer and a printer. On the other hand, if there is frequent movement between the base unit 102 and the remote unit 2214, audio information is preferably communicated on other frequencies so the scanning and locking may occur during such movement and simultaneously with such communication. For example, such communication may occur between a remote unit in an audio headset and a base unit at a workstation or in a briefcase in a portable telephone system. Such a system allows the user to walk about in an area around the base unit.

Figure 21A:
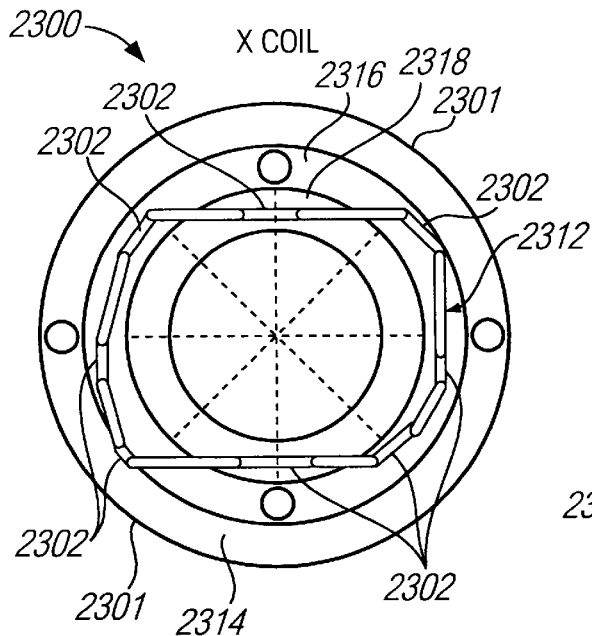
FIGS. 21a, 21b and 21c are shown cross-sectional views of a tri-axial transmitting antenna array along orthogonal planes in accordance with the present invention.
Figure 21C:
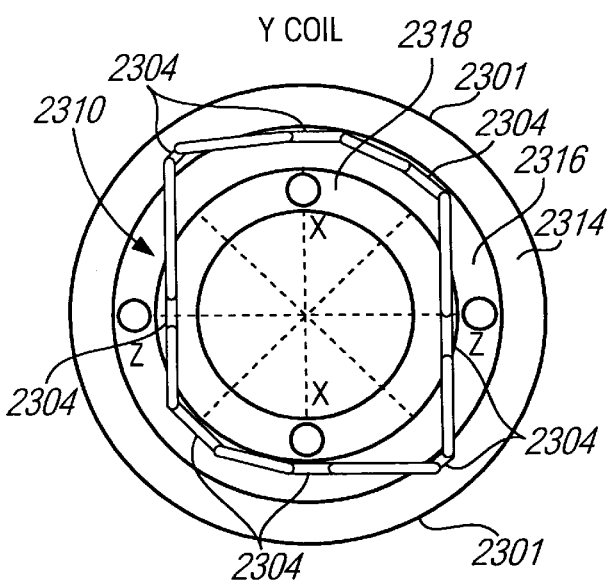
Figure 21B:
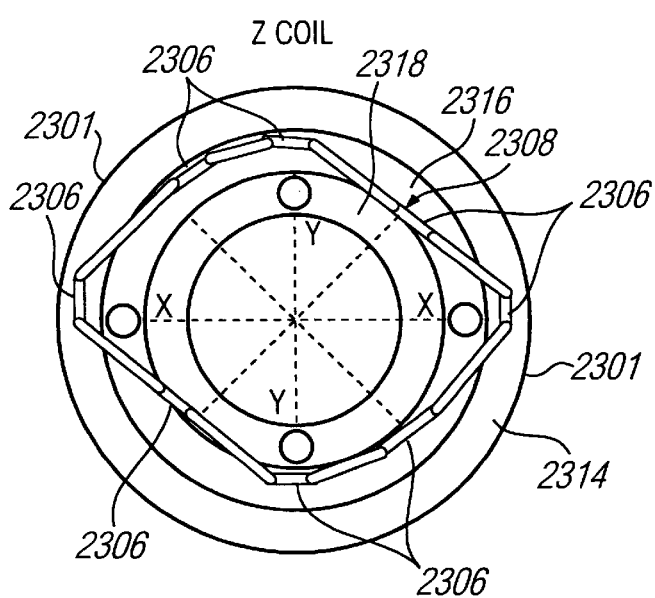

Referring to FIGS. 21a, 21b, and 21c, there are shown cross-sectional views of a tri-axial transmitting antenna array 2300 along orthogonal planes in accordance with the present invention. The tri-axial transmitting antenna array 2300 couples to the remote transceiver 112 (FIG. 1) to receive driving currents that are phase appropriately as described above. The tri-axial transmitting antenna array 2300 includes a permeable core 2301, an X loop 2312, a Y loop 2310, and a Z loop 2308. Each loop 2308, 2310, 2312 is oriented at an angle relative to the other loops. The loops 2308, 2310, 2312 are of substantially identical geometry and cross sections. Likewise, the loops 2308, 2310, 2312 have substantially matching inductance, resistance, and capacitance. The core 2301 is preferably spherical. The core 2301 includes grooves 2302, 2304, and 2306 disposed on the surface. The loops 2308, 2310, 2312 are disposed within the grooves 2302, 2304, and 2306.

FIGS. 21a, 21b, and 21c shows views of the array 2300 towards an X plane, a Z plane, and a Y plane, respectively. Concentric circles 2314, 2316, and 2318 are zones through which the loops 2308, 2310, 2312 pass. The X loop 2312 is disposed first and thus is inside the loops 2310 and 2312. The Y loop 2310 is disposed second, and thus is inside the Z loop 2308 and outside the X loop 2312. The Z loop 2308 is disposed third, and thus is outside both the X loop 2312 and the Y loop 2310.

The base transceiver 106 provides first, second, and third signals to the loops 2308, 2310, and 2312, respectively, to generate a magnetic field and to alter the direction of the magnetic field as described above. The base transceiver 106 may alter the direction of the magnetic field to a direction of a remote unit 104 in response to an RSS signal from the remote unit 104. The RSS signal is a carrier. The remote unit 104 alters the direction of the signal from the base unit 102 in response to the magnetic field.

The base transceiver 106 includes a scan signal in the magnetic field and the remote unit 104 provides the RSS signal at a frequency different than the frequency of the scan signal, and at a frequency different than the frequency of the first, second, and third signals.

Figure 22:
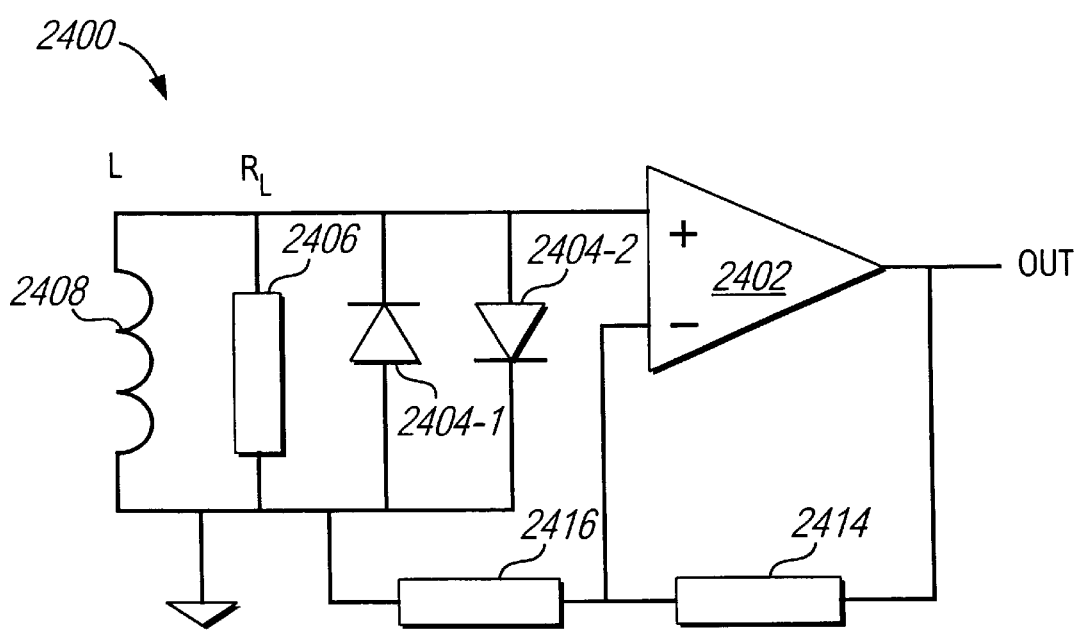
FIG. 22 is a schematic diagram illustrating a conventional pre-amplifier for an inductive receiver.
Figure 23:
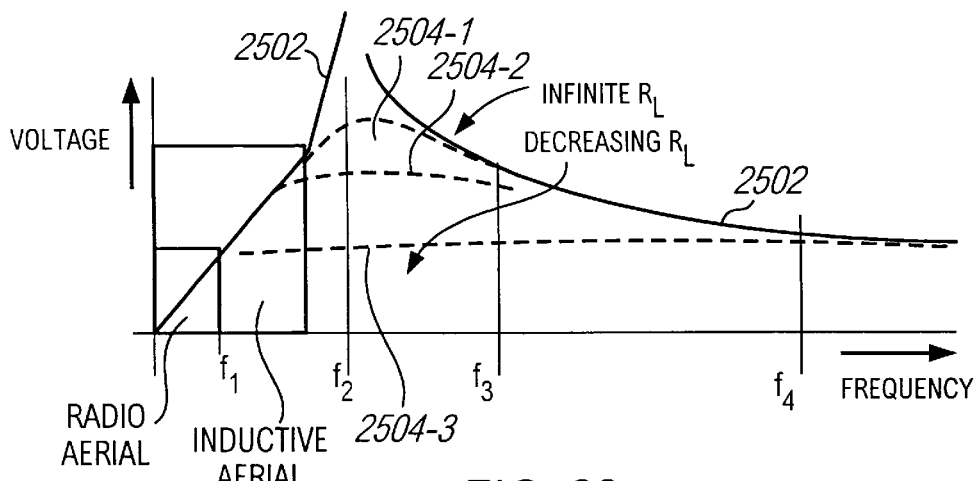
FIG. 23 is a graph illustrating the frequency response of the conventional pre-amplifier of FIG. 22.

Referring to FIG. 22, there is shown a schematic diagram illustrating a conventional pre-amplifier 2400 for an inductive receiver. Referring to FIG. 23, there is shown a graph illustrating the frequency response of the conventional pre-amplifier 2400. The conventional pre-amplifier 2400 includes an inductor 2408, a load resistor 2406, a pair of diodes 2404-1 and 2404-2, an operational amplifier 2402, and first and second feedback resistors 2414 and 2416. The load resistor 2407 and the inductor 2408 are coupled in parallel. Of course, an equivalent series pre-amplifier may be formed. A solid line 2502 and dashed lines 2504-1, 2504-2, 2504-3 show the frequency response of the conventional pre-amplifier for varying resistances of the load resistor 2407. Stray capacitance on the coil creates a resonance in the frequency response. The difference between a low frequency (LF) induction aerial and a radio frequency (RF) aerial is the degree of separation between the normal operating frequency and the self resonant frequency of the aerial. An RF coil operates to a frequency $f_1$, typically a few MHz, but well away from the self resonance. In contrast, an LP induction coil operates to a frequency $f_2$, typically tens of KHz, but close to the self resonance.

At low frequencies (typically of the order of $f_1$), the coil functions as a linear inductor, and the frequency response of the coil is substantially linear up to a frequency of approximately frequency $f_1$. The output voltage obeys Faraday's Law and is proportional to frequency. RF coils having comparatively few turns on a ferrite core, operate as substantially ideal inductors and usually operate in this frequency range. The operating frequency is typically a few percent of the resonant frequency.

In contrast, low frequency coils usually include many turns to generate an adequate voltage within a volume reasonable for a communication link. Such low frequency coils typically include a multi-layer winding. Because of a significant mutual capacitance between these layers, the frequency response has a resonance, $f_2$, that is significantly closer to the operating frequency of the system. An inductive aerial typically operates at a frequency up to about 80 percent of the resonant frequency.

At frequencies above the resonance frequency, the impedance of the aerial is capacitive. At such frequencies, the aerial responds to an electric field component of environmental signals, which in this system is a source of interference. The frequencies at which this occurs is near the operating frequency of the system, and thus these frequencies are within the bandwidth of the frequency shaping pre-amplifier and the receiver of the present invention. The inductive aerial may include an electrostatic shield (not shown) to reduce the electric field component of environmental systems to thereby reduce interference. An electrostatic shield typically reduces the self-resonant frequency of the aerial.

Figure 24:
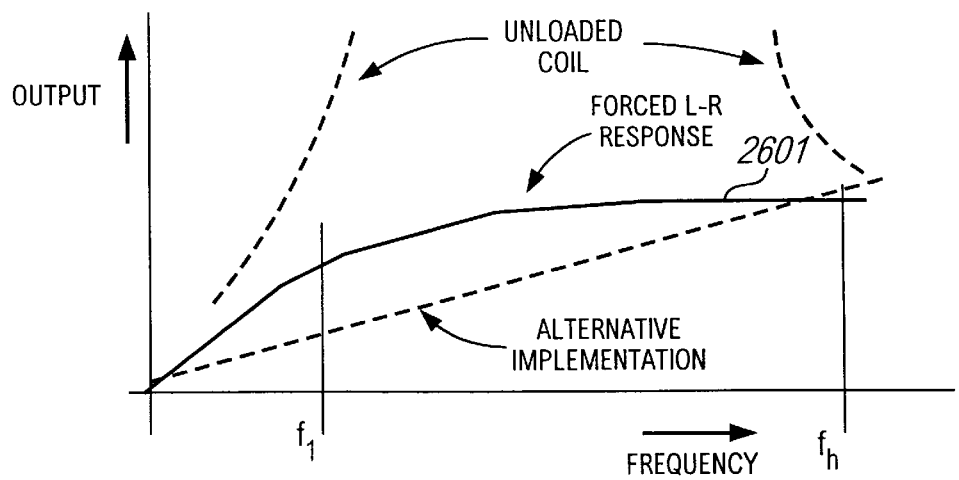
FIG. 24 is a graph illustrating the frequency response of the conventional pre-amplifier of FIG. 23.

Referring to FIG. 24, there is shown a graph illustrating the frequency response of the conventional pre-amplifier 2400 with varying resistances of the load resistor 2407. Changing the resistance of the load resistor 2407 changes the frequency response of the system. Decreasing the resistance of the load resistor 2407 reduces the Q of the resonant peak. If the load resistance is reduced to the level where its admittance dominates the capacitance of the coil, the system has a frequency response of an L-R circuit instead of an L-C-R circuit.

Such a technique has been used in cable locators to obtain operation at discrete widely spaced frequencies, as indicated by $f_1$ and $f_h$ in FIG. 24, from a single aerial. This is advantageous in that an alternative implementation with a high self resonant frequency and the same sensitivity at the frequency fh has a reduced frequency at the frequency $f_1$. However, such a technique has not been applied in the communication links described herein because the alternative implementation produces a smaller lighter aerial.

The present invention provides a communication link that reduces the amplitude variation across the bandwidth. The frequency response shown in line 2601 includes a region in which the second time derivative of the voltage is less than zero and a region in which the voltage is approximately constant. The present invention uses the high frequency zone having the approximately constant voltage. A high sensitivity low resonant frequency inductive aerial operates with a low input impedance amplifier provides a system with wideband FM performance. Alternatively, a preamplifier includes a load resistance that provides similar frequency response characteristics.

Figure 25:
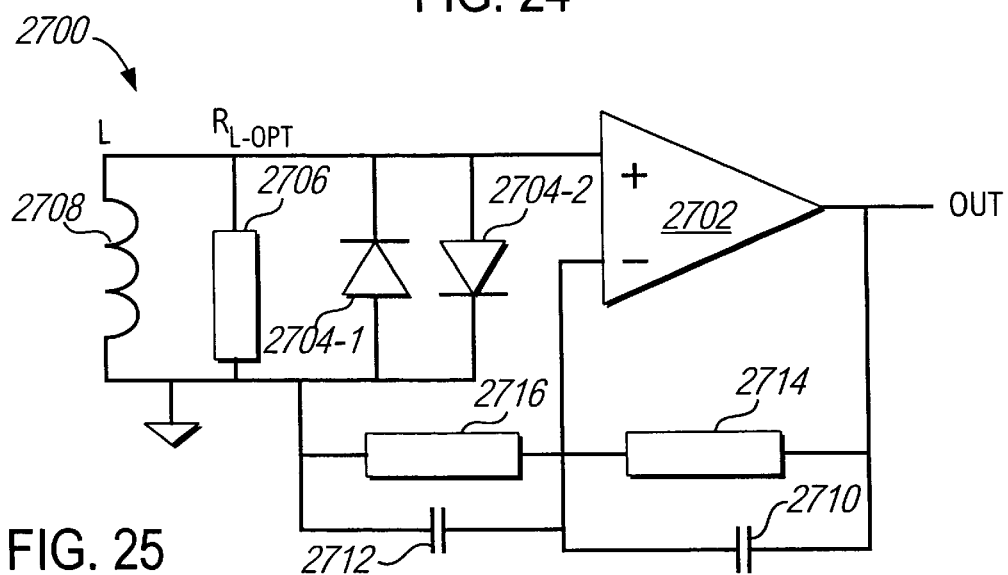
FIG. 25 is a block diagram illustrating a frequency shaping pre-amplifier in accordance with the present invention.

Referring to FIG. 25, there is shown a block diagram illustrating a frequency shaping pre-amplifier 2700 in accordance with the present invention. The frequency shaping pre-amplifier 2700 includes an operational amplifier 2702, a pair of diodes 2704-1 and 2704-2, a load resistor 2706, an inductor 2708, a pair of capacitors 2710 and 2712, and a pair of feedback control circuits 2714 and 2716. The inductor 2708 represents the receiver aerial. The capacitor 2710 and the feedback control circuit 2714 are coupled in parallel and couple a negative input terminal of the operational amplifier 2702 to an output terminal of the amplifier 2702. The capacitor 2712 and the feedback control circuit 2716 are coupled in parallel and couple the negative input terminal of the operational ampler 2702 to ground. The inductor 2708, the load register 2706, and the diodes 2704-1 and 2704-2 are coupled in parallel and couple a positive input terminal of the operational amplifier to ground. An anode of the diode 2704-1 is coupled to a cathode of the diode 2704-2, and a cathode of the diode 2704-1. is coupled to an anode of the diode 2704-2. The pre-amplifier 2700 provides a substantially flat frequency response over a range above a given frequency.

Of course a preamplifier to the drive of the transmit aerial 110 may be implemented for similar frequency characteristics. The frequency response may be linearized by impedance matching and applying the spectral shaping either to the power amplifier or the preamplifier.

Figure 26:
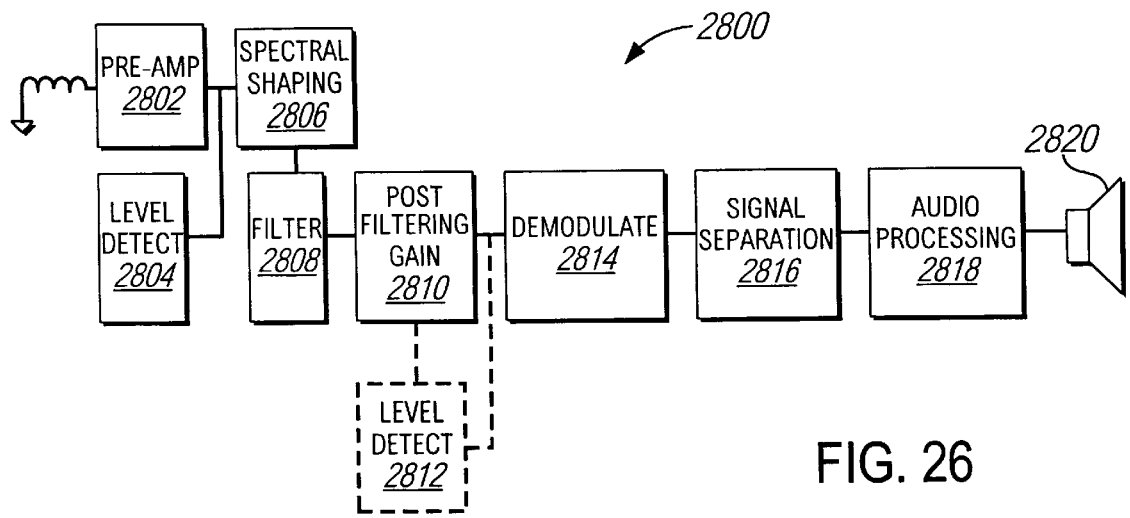
FIG. 26 is a block diagram illustrating a receive circuit for a receive aerial in accordance with the present invention.
Figure 27:
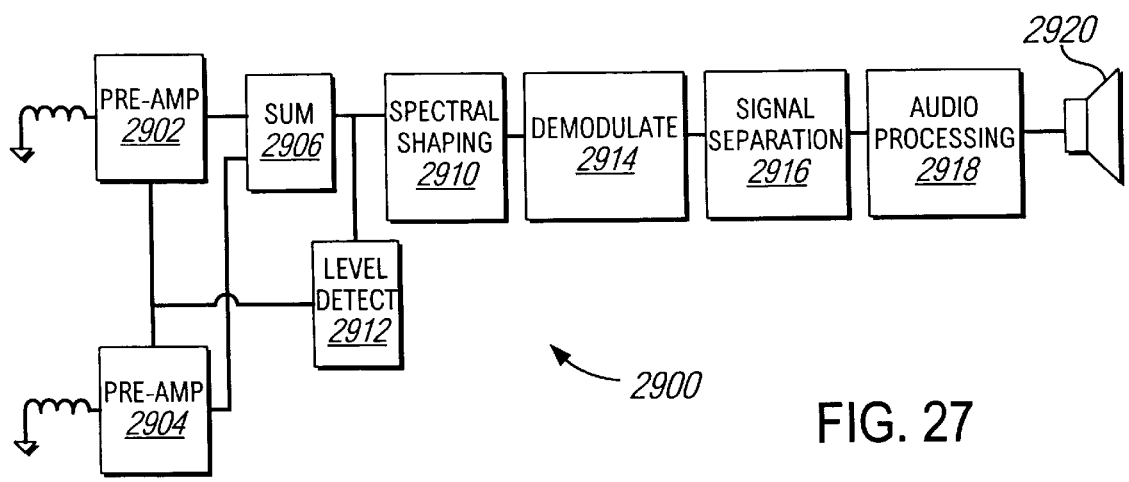
FIG. 27 is a block diagram illustrating a receive circuit for a directional array in accordance with the present invention.
Figure 28:
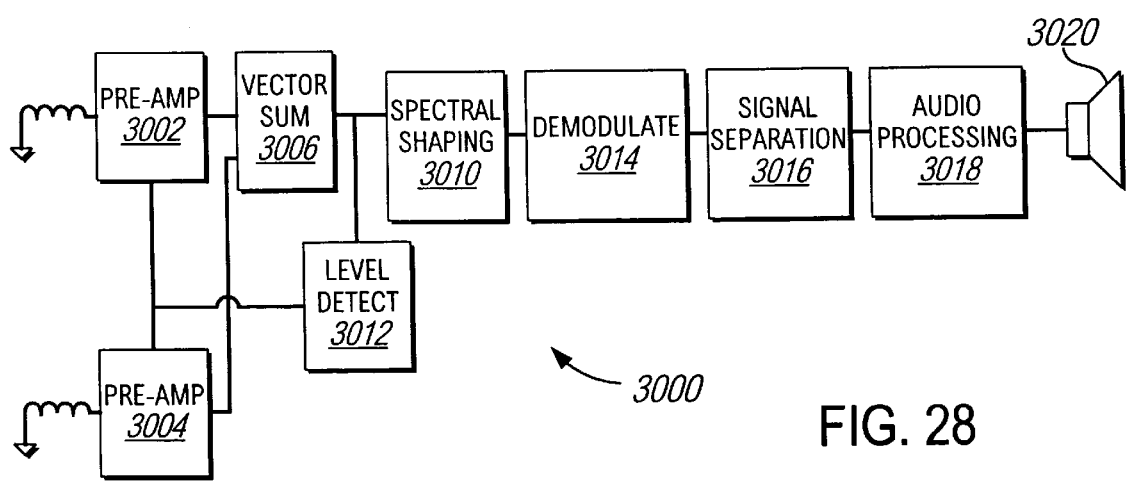
FIG. 28 is a block diagram illustrating a receive circuit for a dual axis aerial in accordance with the present invention.

The frequency shaping of the preamplifier in the receive channel may be implemented as shown in FIGS. 26–28.

Referring to FIG. 26, there is shown a block diagram illustrating a receive circuit 2800 for a receive aerial in accordance with the present invention. The receive circuit 2800 includes a pre-amplifier 2802, a level detector 2804, a spectral shaping circuit 2806, a filter 2808, a post filtering gain amplifier 2810, a level detector 2812, a demodulator 2814, a signal separation circuit 2816, an audio processor 2818, and a sound transducer 2820.

Referring to FIG. 27, there is shown a block diagram illustrating a receive circuit 2900 for a directional array in accordance with the present invention. The receive circuit 2900 includes a pair of pre-amplifiers 2902 and 2904, a summing circuit 2906, a level detector 2912, a spectral shaping circuit 2910, a demodulator 2914, a signal separation circuit 2916, an audio processor 2918, and a sound transducer 2920.

Referring to FIG. 28, there is shown a block diagram illustrating a receive circuit 3000 for a dual axis aerial in accordance with the present invention. The receive circuit 3000 includes a pair of pre-amplifiers 3002 and 3004, a vector summing circuit 3006, a level detector 3012, a spectral shaping circuit 3010, a demodulator 3014, a signal separation circuit 3016, an audio processor 3018, and a sound transducer 3020.

What is claimed is:

1. A magnetic inductive communication system comprising:
    a base unit for transmitting a first rotating magnetic inductive field and for receiving a second rotating magnetic inductive field; and
    a remote unit for transmitting the second rotating magnetic field and for receiving the first rotating magnetic inductive field,
    wherein the rotating fields avoid directional nulls by providing a continuous constant response throughout a range of angles without switching between multiple transducers.

2. The communication system of claim 1, wherein the base unit includes a first aerial array that comprises a first component aerial and a second component aerial that respectively generate a first field component and a second field component, the first and second component aerials being respectively driven by a first current and a second current having a phase difference that causes the first magnetic inductive field to be a rotating magnetic inductive field.

3. The communication system of claim 2, wherein the first aerial array further comprises a third component aerial driven by a third current, and wherein the relative value of the first and third currents determines a plane of rotation for the first magnetic inductive field.

4. The communication system of claim 3, wherein the first current exceeds the third current to rotate the first magnetic inductive field in a plane of the third component aerial.

5. The communication system of claim 3, wherein the third current exceeds the first current to rotate the first magnetic inductive field in a plane of the first component aerial.

6. The communication system of claim 3, wherein a range of third current values are provided to cause the plane of rotation for the first magnetic inductive field to sweep through a 360 degree volume of rotation.

7. The communication system of claim 3, wherein the plane of rotation for the first magnetic inductive field is tilted to optimize coupling between the first aerial array and a second aerial in the remote unit.

8. A magnetic inductive communication system, comprising:
    a first aerial for generating a first magnetic inductive field and for receiving a second magnetic inductive field, wherein the first aerial is a loop and the first magnetic inductive field is generated external to a space enclosed by the loop; and
    a second aerial for generating the second magnetic inductive field and for receiving the first magnetic inductive field,
    wherein the first magnetic inductive field communicates data from the first aerial to the second aerial and the second magnetic inductive field communicates data from the second aerial to the first aerial,
    wherein the first aerial is an aerial array that comprises a main multi-turn loop aerial and an auxiliary multi-turn loop aerial that respectively generate a main magnetic inductive field and an auxiliary magnetic inductive field to generate the first magnetic inductive field, the main multi-turn loop aerial being spaced apart from the auxiliary multi-turn loop aerial at a distance at which the sum of the main and auxiliary magnetic inductive fields is directional and quasi-static.

9. The communication system of claim 8, wherein the respective loops of the main multi-turn loop and auxiliary multi-turn loop aerials each have a first dimension and a second dimension, the first dimension being substantially greater than the second dimension.

* * * * *

UNITED STATES PATENT AND TRADEMARK OFFICE
CERTIFICATE OF CORRECTION

PATENT NO. : 5,966,641
DATED : October 12, 1999
INVENTOR(S) : Peter M. Flowerdew It is certified that error appears in the above-identified patent and that said Letters Patent is hereby corrected as shown below:

Title page, item [54], and column 1, should read: --Aerial Arrays for Inductive Communication Systems--

Title page, item [56], should read:
--U.S. PATENT DOCUEMNTS

| | | | |
|---|---|---|---|
| 3,569,969 | 3/1971 | Lemon, Jr. | 343/225 |
| 3,660,760 | 5/1972 | Schaad et al. | 325/28 |
| 3,711,651 | 1/1973 | Connell | 179/15 BT |
| 3,766,476 | 10/1973 | Silitch | 325/26 |
| 3,809,825 | 5/1974 | Schaad et al. | 179/82 |
| 4,250,507 | 2/1981 | Wingard | 343/742 |
| 4,747,158 | 5/1988 | Goldberg et al. | 455/11 |
| 4,908,869 | 3/1990 | Lederman | 381/79 |
| 4,922,261 | 5/1990 | O'Farrell | 343/867 |
| 4,941,201 | 7/1990 | Davis | 455/41 |
| 5,027,709 | 7/1991 | Slagle | 102/427 |
| 5,258,766 | 11/1993 | Murdoch | 343/742 |
| 5,321,412 | 6/1994 | Kopp et al. | 343/867 |
| 5,426,409 | 6/1995 | Johnson | 336/178 |
| 5,437,057 | 7/1995 | Richley et al. | 455/41 |
| 5,568,516 | 10/1996 | Strohallen et al. | 375/259 |
| 5,694,139 | 12/1997 | Saito et al. | 343/742 |
| 5,771,438 | 6/1998 | Palermo et al. | 455/41-- |

UNITED STATES PATENT AND TRADEMARK OFFICE
CERTIFICATE OF CORRECTION

PATENT NO.    : 5,966,641
DATED         : October 12, 1999
INVENTOR(S)   : Peter M. Flowerdew It is certified that error appears in the above-identified patent and that said Letters Patent is hereby corrected as shown below:

Title page, item [56], Under "FOREIGN PATENT DOCUMENTS" please add:

--225,901   1943   Antenne Und Kabel   343/867
2 123 214 A   1/1984   Roberts United Kingdom   343/867
WO 92/00635   1/1992   Oy WIPO   455/41--

Column 5,
Line 8, should read: $--H_z = \dfrac{Ib}{\pi Z^2} --$.

Signed and Sealed this

Twenty-sixth Day of June, 2001

*Attest:*

*Attesting Officer*

NICHOLAS P. GODICI
*Acting Director of the United States Patent and Trademark Office*